(12) United States Patent
Davis

(10) Patent No.: US 7,636,509 B2
(45) Date of Patent: Dec. 22, 2009

(54) MEDIA DATA REPRESENTATION AND MANAGEMENT

(75) Inventor: Darren R. Davis, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 359 days.

(21) Appl. No.: 11/247,743

(22) Filed: Oct. 11, 2005

(65) Prior Publication Data

US 2007/0033225 A1 Feb. 8, 2007

Related U.S. Application Data

(63) Continuation-in-part of application No. 11/197,068, filed on Aug. 4, 2005.

(51) Int. Cl.
H04N 5/76 (2006.01)
H04N 7/00 (2006.01)
H04N 5/00 (2006.01)

(52) U.S. Cl. .......................................... 386/46; 386/125

(58) Field of Classification Search .............. 707/104.1, 707/3; 703/11; 386/1, 45, 46, 125, 126
See application file for complete search history.

(56) References Cited

U.S. PATENT DOCUMENTS

| | | | |
|---|---|---|---|
| 5,355,302 A | 10/1994 | Martin et al. | |
| 5,862,325 A | 1/1999 | Reed et al. | |
| 6,725,281 B1 * | 4/2004 | Zintel et al. | 719/318 |
| 6,760,721 B1 | 7/2004 | Chasen et al. | |
| 7,058,964 B2 | 6/2006 | Khandelwal et al. | |
| 7,136,874 B2 | 11/2006 | Mercer et al. | |
| 7,227,971 B2 | 6/2007 | Nagao | |
| 7,451,152 B2 * | 11/2008 | Kraft et al. | 707/10 |
| 2002/0056118 A1 | 5/2002 | Hunter et al. | |
| 2002/0073220 A1 | 6/2002 | Lee | |
| 2002/0146234 A1 | 10/2002 | Mizuno | |
| 2002/0147728 A1 | 10/2002 | Goodman et al. | |
| 2002/0180803 A1 | 12/2002 | Kaplan et al. | |

(Continued)

OTHER PUBLICATIONS

Unknown, "iPod Technical Specifications," printed on Aug. 3, 2005, printed from http://www.apple.com/ipod/color/specs.html, 2005, 3 pages, Apple Computer, Inc., U.S.A.

(Continued)

Primary Examiner—Thai Tran
Assistant Examiner—Nigar Chowdhury
(74) Attorney, Agent, or Firm—Senniger Powers LLP

(57) ABSTRACT

Managing media objects on a computing device executing a media player application for rendering one or more of the media objects. The media objects have metadata associated therewith. A media object is defined to represent the media object, which includes a plurality of properties where at least one of the properties of the media object is representative of media content of the media object and where at least another one of the properties of the media object is representative of metadata associated with the media object. The media object is dynamically exposed to the media player application for performing one or more operations on the properties. The properties of the media object are alternatively exposed without exposing the media object represented thereby. Alternatively, a set of rules for each of the properties is defined, and one or more operations are dynamically exposed as a function of the defined set of rules.

19 Claims, 16 Drawing Sheets

U.S. PATENT DOCUMENTS

| | | | |
|---|---|---|---|
| 2002/0198864 | A1 | 12/2002 | Ostermann et al. |
| 2003/0088573 | A1 | 5/2003 | Stickler |
| 2004/0039648 | A1 | 2/2004 | Candelore et al. |
| 2004/0128308 | A1 | 7/2004 | Obrador |
| 2004/0199491 | A1 | 10/2004 | Bhatt |
| 2004/0220791 | A1* | 11/2004 | Lamkin et al. ............. 703/11 |
| 2004/0267774 | A1 | 12/2004 | Lin et al. |
| 2005/0055337 | A1 | 3/2005 | Bebo et al. |
| 2006/0114832 | A1* | 6/2006 | Hamilton et al. ............ 370/244 |
| 2007/0180066 | A1 | 8/2007 | Sherwood et al. |

OTHER PUBLICATIONS

Unknown, "Zen MP3 Players Features," printed on Aug. 3, 2005, printed from http://www.creative.com/products/product.asp?category=213&subcategory=214&product=..., 2005, 4 pages, Creative Technology Ltd., U.S.A.

Unknown, "Nokia Launches Mobile Music Solution for Operators Worldwide," printed on Aug. 3, 2005, printed from http://www.loudeye.com/en/news/release.asp?pressreleaseld=229, Feb. 14, 2005, 2 pages, U.S.A.

Unknown, "Motorola Offers Sneak Peak of New iRadio Solution at Demo@15 Conferences," printed on Aug. 3, 2005, printed from http://www.motorola.com/mediacenter/news/detail/0,,5178_5172_23,00.html, Feb. 13, 2005, 2 pages, U.S.A.

Beard, M. Kate et al., Multilevel and Graphical Views of Metadata, IEEE, 1998, 10 pages, 0-81868464-X/98.

Waugh, Andrew, Specifying Metadata Standards for Metadata Tool Configuration, http://www7.scu.edu.au/1913/com1913.htm, printed Apr. 17, 2007.

* cited by examiner

MEDIA DATA REPRESENTATION AND MANAGEMENT

CROSS-REFERENCE TO RELATED APPLICATION

This application is a continuation-in-part of U.S. patent application Ser. No. 11/197,068, filed Aug. 4, 2005, entitled "MANAGEMENT OF MEDIA SOURCES IN MEMORY CONSTRAINED DEVICES," assigned to or under obligation of assignment to the same entity as this application, which is incorporated by reference.

BACKGROUND

Digital media contents are omnipresent nowadays; from the music files played in a portable media device (such as a favorite album played on a MP3 player) to a series of digital video clips (such as TV programming) or a digital photo album displayed on one's computer (such as someone's vacation photos). In each of these examples, the information associated with these media (e.g., the name of the album, time of the vacation, or the like) is just as important as the media itself. Users are interested in more than just the content of a particular piece of digital media. In many situations, the users want to know how media content relates to them (e.g., the name of a favorite album), to what does media content refer (e.g., TV programming), how the media content relates to other content of the same type (e.g., winter ski trip photos versus summer beach trip photos), or how media content may be associated in other organized or arbitrary ways. The abundance of digital media contents coupled with the cataloging of the information associated with them makes searching, representing, and/or managing digital media contents a challenge.

Typically, media contents and information are linearly organized. While they may be represented in many different ways, simple text strings are often frequently used. For example, suppose a user wishes to retrieve from a data store a list of albums that is currently available to the user. Current implementations typically would retrieve a list of names of albums in text strings. No other related information is provided to the user. If the user next wishes to retrieve the content (e.g., a title of a song) from one of the albums, another query is performed to retrieve the new information (e.g. the titles) from the previous retrieved results.

While such basic and logical scheme functions well in representing media contents, it fails to account for the wealth of information that should be included. From the example above, if there are two albums by two different artists with the identical name, such as "Greatest Hits," current implementations would report two instances of the text strings "Greatest Hits," leaving the user short of knowing which "Greatest Hits" albums belong to which artist. In some embodiments, only one instance of the string "Greatest Hits" may be returned, making even the count of elements incorrect. Users are also interested in understanding how groups of objects relate. If presented with the a list of text strings that represent a file system location for a number of digital photos most users would be forced to examine each photo to determine relevancy or value thereof. However, if users receive the same list of text strings with the knowledge that they are photos from their last vacation, they are immediately able to better judge relevancy and to determine the value of the photos.

In addition, digital portable media devices have expanded the reach of digital media content and have provided the convenience of playback of digital media files. Portable media devices, such as MP3 players, cellular phones, smart phones, personal digital assistants (PDA), and the like, play digital audio and/or video files and display digital graphics or images. These portable media devices typically have a memory storage area to store the media files or media objects. In managing the stored media objects, the portable media devices customarily build a database structure, such as a media library, in the fixed or local memory storage area available on the device. This storage may be in a solid state or magnetic (fixed disk) format.

Currently, some portable media devices reserve an amount of memory storage area for the media library to organize the media objects, in addition to storing the media objects. For example, the portable media devices may store a set of tables or an index table listing the media objects by information such as content genre, content artist, content duration, content title, content collection (album), or the like relating to the media objects.

However, in existing portable media devices where the memory storage area has a limited capacity, reserving and maintaining the media library in the memory storage area hinders the amount of media objects that can be stored in the same memory storage area. Some portable media devices are configured to accept portable or removable memory sources, such as flash memory cards (e.g., Universal Serial Bus (USB) memory sticks, xD card), or the like, to store additional media objects. These portable media devices, however, fail to provide a full and rich media library management capability to manage media objects stored in one or more storage sources.

A simplistic approach to providing a richer media management experience involves trying to "pre-budget" an amount of space in the fixed or local memory storage on the device to hold information about the media objects available on each of the removable storage devices inserted in the device. Since removable storage continue to increase in storage limits, any attempt to "pre-budget" enough space on the memory storage area of the portable media device to store the maximum possible number of entries will result in placing a maximum size limit on the removable storage that can be used in the device. In addition, users typically want more space so this artificial limit may make the device unappealing to the users as the size of compatible removable storage grows larger than the maximum size the portable media device supports. With users having multiple cards or removable memory sources, a fixed amount of reserved memory or an expected limit of memory on the portable media device is impracticable to accommodate a large database in the portable media device.

SUMMARY

Embodiments of the invention overcome the shortfalls for prior systems by hierarchically (e.g., in a tree data structure) representing and managing media objects and contents as a collection of media objects and contents. Such representation conveniently associates relevant data and metadata to each media object or content to facilitate managing and rendering of the media objects and contents. In one aspect of the invention, an application programming interface (API) is used to represent and manage media objects and contents so that a media player application (e.g., a media player) can communicate with a media provider (e.g., a data store, a media library, an online music store, or the like) to discover, group, and manipulate media objects.

By finding, retrieving, and storing metadata of media objects via communications with a media provider, alternative embodiments of the invention efficiently represent media objects to the user of the portable media device with a full and rich user experience with a complex view of a collection of available digital media objects. In addition, embodiments of the invention, in response to a query from a user, provide a query result identifying locations (either local or external) of media objects that are available to the user. In particular, embodiments of the invention represent, for example, the removable storage sources, remote media repositories, remote subscription sources, and remote media broadcasting sources to the host application of a portable media device. Finally embodiments of the invention enable users to select content from one of these collections or to select one or more collections and render the content of the files.

In addition, embodiments of the invention support storing a media library or media database content on removable read/write media instead of storing it on the local memory storage area of a portable media device. In particular, embodiments of the invention permit maintaining a database that includes information relating to the media objects in the most informative manner for the user. Embodiments of the invention enable portable media devices with a limited local storage to support removable storages for maintaining a media library that efficiently aggregates and manages media objects stored in the local storage, the removable storage sources, and/or other content repositories through some form of network connection. Embodiments of the invention also provide for intelligent background updating of the media database or media library to make sure that the portable media device stays in sync with the contents of the removable storage.

Other features will be in part apparent and in part pointed out hereinafter.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Figure 1A:
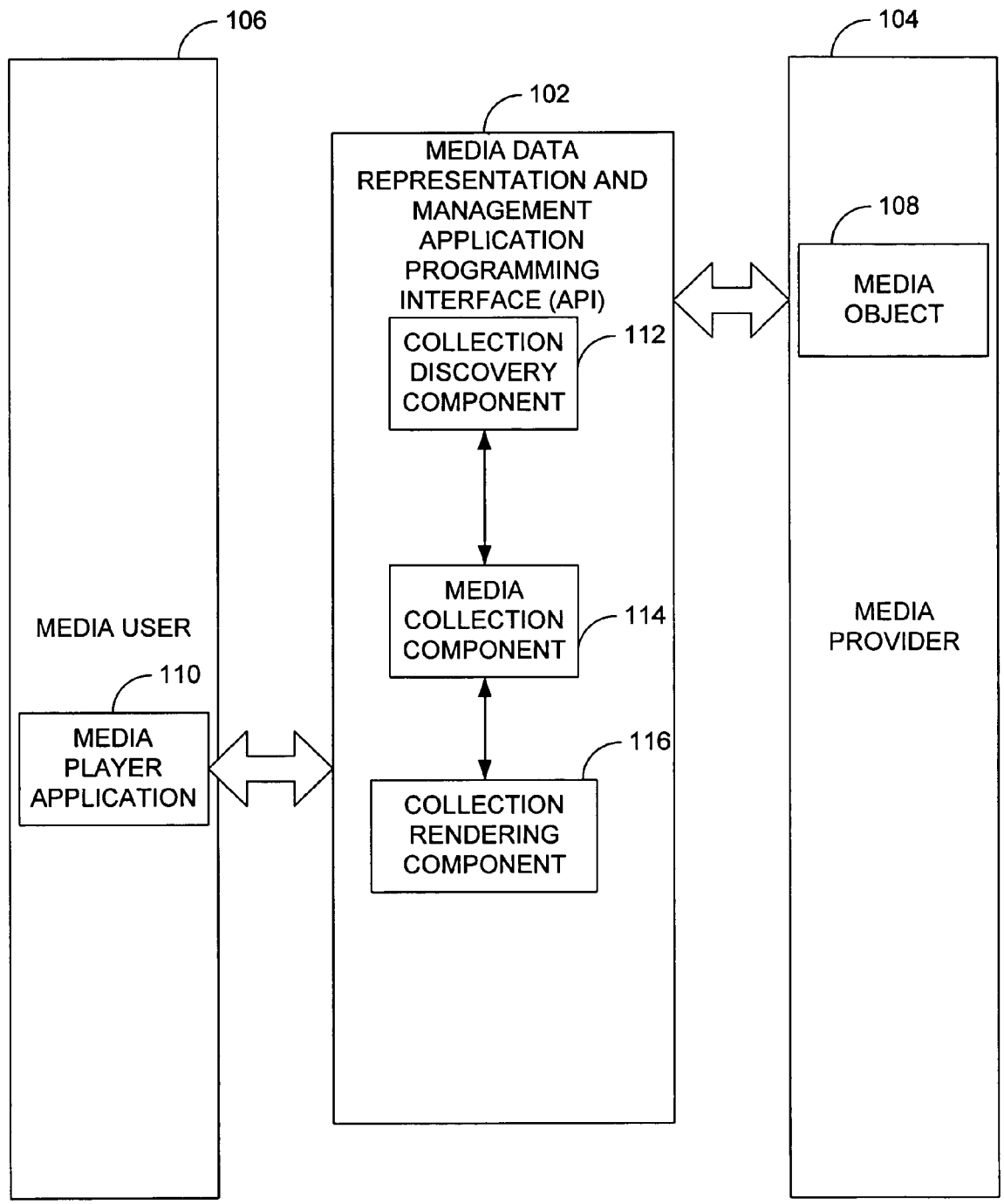
FIG. 1A is an exemplary diagram illustrating an application programming interface (API) embodiment for representing and managing media objects between a media player application and a media provider according to an embodiment of the invention.

Appendix A illustrates exemplary programming codes to be used in header files according to an embodiment of the invention.

Corresponding reference characters indicate corresponding parts throughout the drawings.

DETAILED DESCRIPTION

Referring first to FIG. 1A, a block diagram illustrating an API 102 embodiment for representing and managing media objects or items according to an embodiment of the invention. In one example, the API 102 establishes and facilitates communications between a media provider 104 and a media user 106. For example, the media provider 104 may be a data store, a data warehouse, a memory storage area, a media content broadcasting or a streaming source, or other source where media item or media object (hereinafter "media object") 108 may be directly or indirectly provided to the media user 106.

In one example, the media object 108 may include a digital media file or digital object representing an audio recording, a motion picture or video clip, a photograph, a web page, a streaming audio/video file, a live audio/video stream, or a collection of audio recordings, a set of motion pictures or video clips, photographs, television programming, streaming audio/video files, and/or live audio/video streams. In another embodiment, media object 108 includes metadata and information associated with the media object 108 or a collection of media objects 108. In another example, a collection of media objects includes media objects based on one or more following criteria: sharing one or more common features or properties based on metadata associated with media object 108 or defined by other user defined criteria. For example, user defined criteria may include favorite workout music, July 4th summer vacation photo collections, or the like. The properties may be based on common features of a piece of metadata (e.g., tracks from the same album, movies by a particular director, tracks by a particular artist that were number one on the charts for more than 5 weeks), or other arbitrary groupings (e.g., songs ordered together by a user for a particular purpose—for example "my workout music").

In an alternative embodiment, media object 108 includes media objects for representing a reference to an associated media object during runtime. The metadata associated with media object 108 includes information in the form of text, images, or references to other pieces of digital media. The amount of information in the metadata may be very limited, such as the source location for media object 108, or it may be extensive, such as lyrics for a song, biographical information about a particular actor or director in a feature film, a graphical representation, links to other material, or the like.

The media user 106 receives media object 108 from media provider 104 via API 102. For example, media user 106 may use a media player application 110 to interact with media object 108. The media player application 110 may be an audio or video media player, a set of computer-executable instructions hosting the rendering or playback of an audio or video media object 108. Alternatively, media player application 110 may be designed for the purpose of managing media objects and associated collections. In one embodiment, API 102 includes a collection discovery component 112 for identifying media objects from a plurality of sources, a media collection component 114 for organizing the identified media objects in a hierarchical structure, and a collection rendering component 116 for rendering the organized media objects according to the requirements of media player application 110, each of which is discussed in further detail in FIGS. 2A to 2F and 3A to 3H. In an alternative embodiment, API 102 is used and/or embedded in a system 100 as illustrated in FIG. 1B.

Figure 1B:
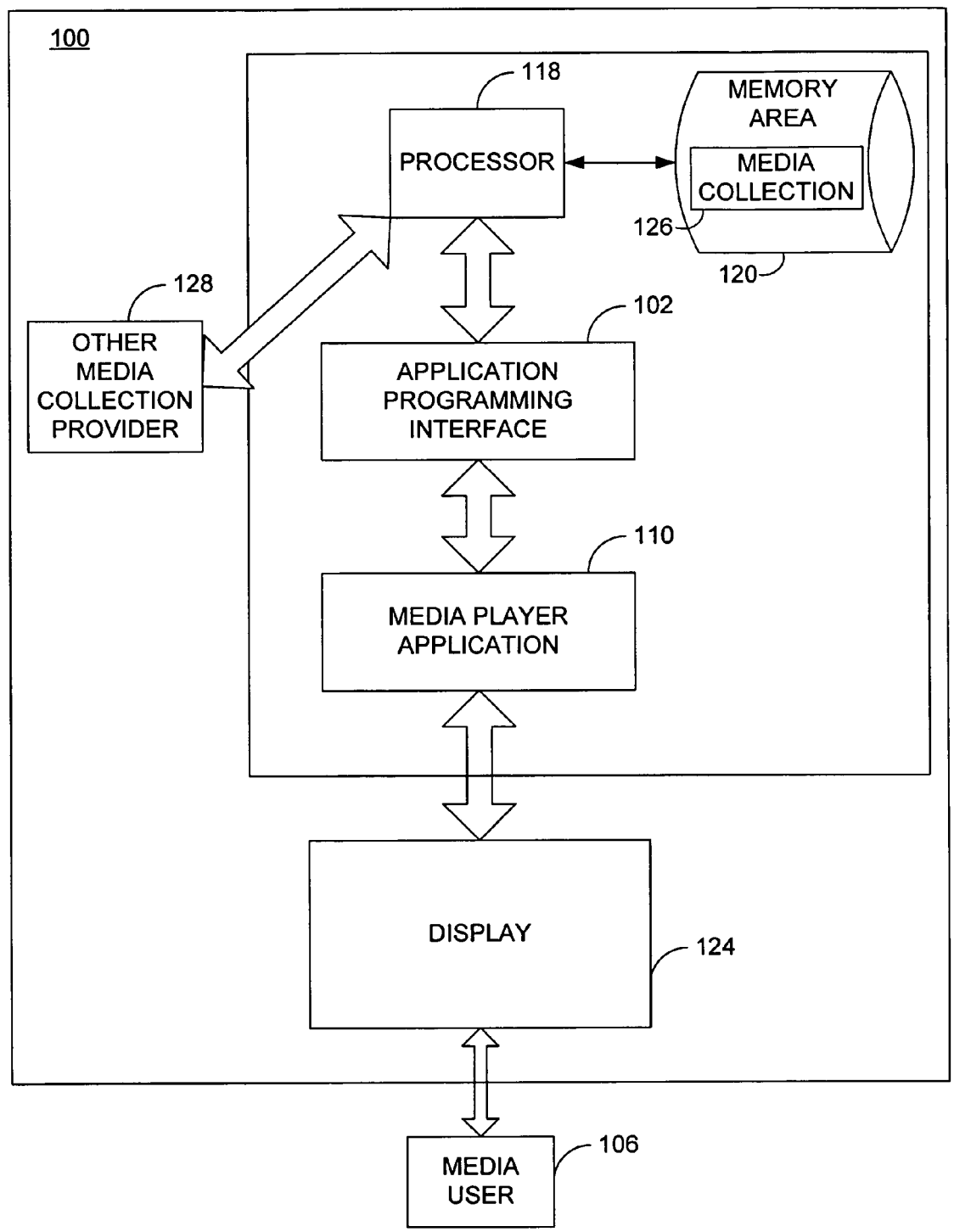
FIG. 1B is an exemplary embodiment of a system for representing and managing media objects according to an embodiment of the invention.

FIG. 1B illustrates the system 100 embodying API 102 for representing and managing media objects according to an embodiment of the invention. The system 100 may include a general purpose computing device in the form of a computing or computational device which may be portable or non-portable (e.g., a desktop/server computer, a laptop computer, or a mobile device). In one embodiment, system 100 has one or more processing units or processors 118 and a memory area 120. As known to those skilled in the art, system 100 may also include a system bus (not shown) coupling the memory area 120 and the processor 118 with various system components, such as an input device (e.g., a keyboard, a microphone, or the like), an output device (e.g., a liquid crystal display (LCD) 124), additional computer-readable storage medium (e.g., both volatile and nonvolatile media, removable and non-removable media), communication interface or source (e.g., wired or wireless communication interfaces for transmitting signals), and/or other components or devices.

For example, the memory area 120 includes RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information, such as a media collection 126, and that may be accessed by system 100. In one embodiment, memory area 120 is remote from system 100 such that media user 106 may need a prior or an established agreement or right (e.g., a subscription) to access media collection 126 stored in memory area 120. In an alternative embodiment, another media collection provider 128 provides media collection 126 (e.g., a collection of one or more audio or video streaming sources, an on-demand media source, or the like) to system 100 via some form of external communication media. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The processor 118 is configured to execute computer-executable instructions, routines, application programs, software, computer-executable instructions codes, or program modules. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In another embodiment, the processor 118 is generally programmed by means of instructions stored at different times in the various computer-readable storage media of the system 100. Programs and operating systems are typically distributed, for example, on floppy disks or CD-ROMs. From there, they are installed or loaded into the secondary memory of a computing device. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor.

The system 100 processes media collection 126, which may be a collection of one or more audio files, video clips, motion picture files, or a series of graphic images (e.g., a slide show) or any combination stored on a computer-readable medium. In an alternative embodiment, the media collection 126 may be a collection of zero or more live media streams transmitted from a broadcasting source in a distributed system via the common communication network. In an alternative embodiment, media collection 126 may include no media item. For example, as media objects are organized as media collections 126, when media user 106 conducts a query for "Beatles Greatest Hits" on memory area 120, if there is no result, a media collection containing no media object is represented in the structure (to be discussed in detail in FIGS. 3A-3H). In other words, media collection 126 represents a collection of zero media items.

The processor 118 executes media player application 110 for rendering media collection 126. For example, the media player application 110 may be audio playback software or video rendering software for playback of motion picture.

Figure 1C:
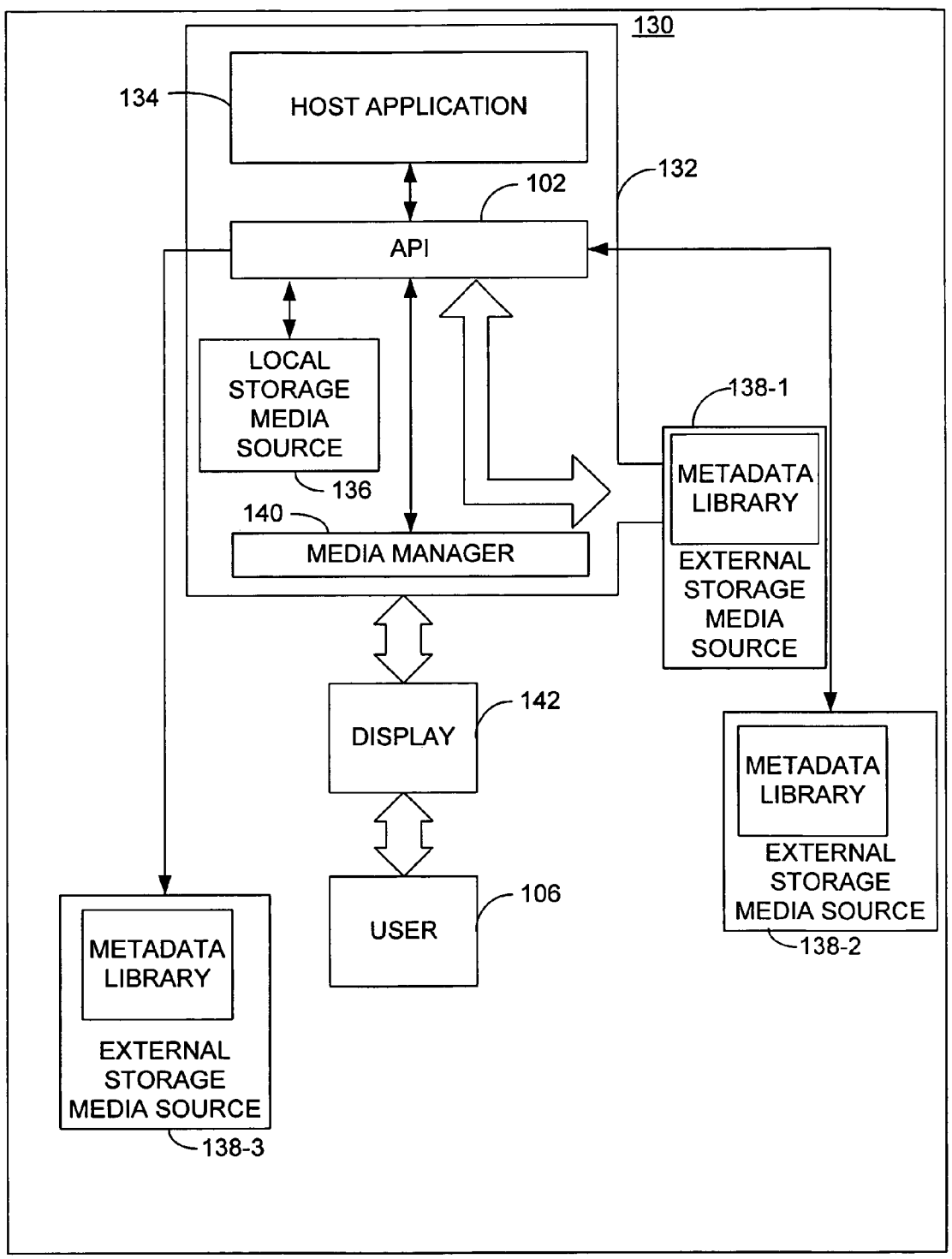
FIG. 1C is an exemplary embodiment of a portable device system for representing and managing media objects according to an embodiment of the invention.

In another embodiment where API 102 is used in memory constrained devices (e.g., portable devices), FIG. 1C illustrates a system 130 for managing media information on a computing device 132 according to an embodiment of the invention. For example, the computing device 132 includes a processor (not shown) configured for executing computer-executable instructions, routines, codes, or the like. In one embodiment, the processor (such as the processing unit 118 in FIG. 1B) is included in the computing device 132 for executing applications, application programs, or software applications such as a host application 134. The computing device 132 may be a fixed purpose digital media player such as an MP3 player, a more general purpose portable media player, a cellular phone, a PDA, a smart phone, or other digital media device that is capable of playback or management of digital media objects. In particular, the host application 134 provides a number of operations, such as playback of the media objects, pause playing the media objects, fast-forward or rewind the playing of the media objects or other operations that may be processed to playback media objects.

Still referring to FIG. 1C, computing device 132 includes a plurality of media sources storing media objects. In one embodiment, computing device 132 includes a local storage media source 136 and one or more external storage media sources 138. For example, computing device 132 includes the local storage media source 136 for storing basic codes or data that are needed to be processed for operating computing device 132. Such basic codes or data include personalization settings, such as name of media user 106, an execution environment of computing device 132, such as date, time, or the like, or other initialization codes. The local storage media source 136 may also store media objects and information relating to a user preference of using computing device 132. By representing media objects stored in local storage media source 136 or external storage media source 138 according to embodiments of the invention, each of the media objects with associated properties 304 in FIG. 3A (e.g., metadata, computed data, or the like) is exposed to API 102 for use by media user 106.

Unlike existing portable media devices which purposefully reserve a portion of the local storage media source 136 to store media library or an organizational database to organize or manage media objects stored in the local storage media source 136, computing device 132 overcomes the shortcomings of known art by identifying the one or more external storage media sources 138 through collection discovery component 112 and by representing those sources as a media library collections according to media collection component 114. As such, the need to reserve storage in local storage media source 136 is removed (thus expanding the usability of local storage media source 136), and each external media source 138 may independently represent its media collections and objects through the media library collection.

In this embodiment, collection discovery component 112 incorporated in computing device 132 identifies one or more media collections and objects stored in at least local storage media source 136 and external storage media sources 138. In one embodiment, collection discovery component 112 establishes a data connection, either through a wired or wireless means, between computing device 132 and external storage media sources 138. For example, as shown in FIG. 1C, external storage media source 138-1 may be a flash memory card, USB memory drive, or another removable storage device or memory-constrained device that may be inserted into or coupled with computing device 132 via collection discovery component 112. As another example, collection discovery component 112 may establish a wired or wireless connection between computing device 132 and external storage media source 138-2, which may be a hard drive or a memory area of another computing device, such as system 100 in FIG. 1B. In yet another example, collection discovery component 112 may further establish a wired or wireless connection between computing device 132 and external storage media source 138-3, which may be a storage or a memory area having media objects available in a network, such as an intranet, an internet, or the like that makes media objects available to media user 106 through subscription-based access.

In an alternative embodiment, a set of basic primitives is defined for external storage media sources 138 and are operational across the sources represented to enable host application 134 to gain easy access to the different media objects and collections stored in external storage media sources 138 via collection discovery component 112.

Once collection discovery component 112 is made aware of the different media sources available collection discovery component 112 exposes the different media sources to host application 134 using collection management component 114. By representing the different media sources in a consistent and collection-oriented manner, host application 134 is able to generically access and manage the local media source 136 and any external media sources 138 regardless of the specific technology or protocols necessary to communicate with each source.

The computing device 132 also includes a display 142 for displaying a user interface generated for displaying the information related to media objects as a result of collection discovery component 112 and media collection component 114 on computing device 132. In one embodiment, playback of digital media objects involves reproducing both the content of the media objects as well as the media information associated with the content of the media objects. While host application 134 is configured to playback the contents of the media objects, computing device 132 includes a media manager 140 for managing the sources of media information retrieved by collection discovery component 112 that are exposed using media collection component 114 for viewing the properties 304, metadata, or other information associated with the content of the media objects, collections, and sources. In one embodiment, media manager 140 is capable of managing media objects and collections in various media formats in each of the different media sources, such as local, external, removable, or remote. In an alternative embodiment, media manager 140 responds to notifications from collection discovery component 112 and media collection component 114 and notifies host application 134 or media user 106 of changes of media objects and collections in local storage media source 136 or external storage media sources 138.

FIGS. 2A-2F illustrate aspects of the management of media objects and collections stored in external storage media sources according to an embodiment of the invention. As discussed above, media manager 140 facilitates communication between media provider 104 and media user 106 for the purpose of managing media sources, objects and collections. In this embodiment, media manager 140 displays media objects and collections from a plurality of sources based on the results of using collection discovery component 112. A computing device 202 includes media manager 140 for managing media objects and collections stored in external storage media sources 204, 206, and remote online subscription 250 connected via the collection discovery component 112 of API 102.

Figure 2A:
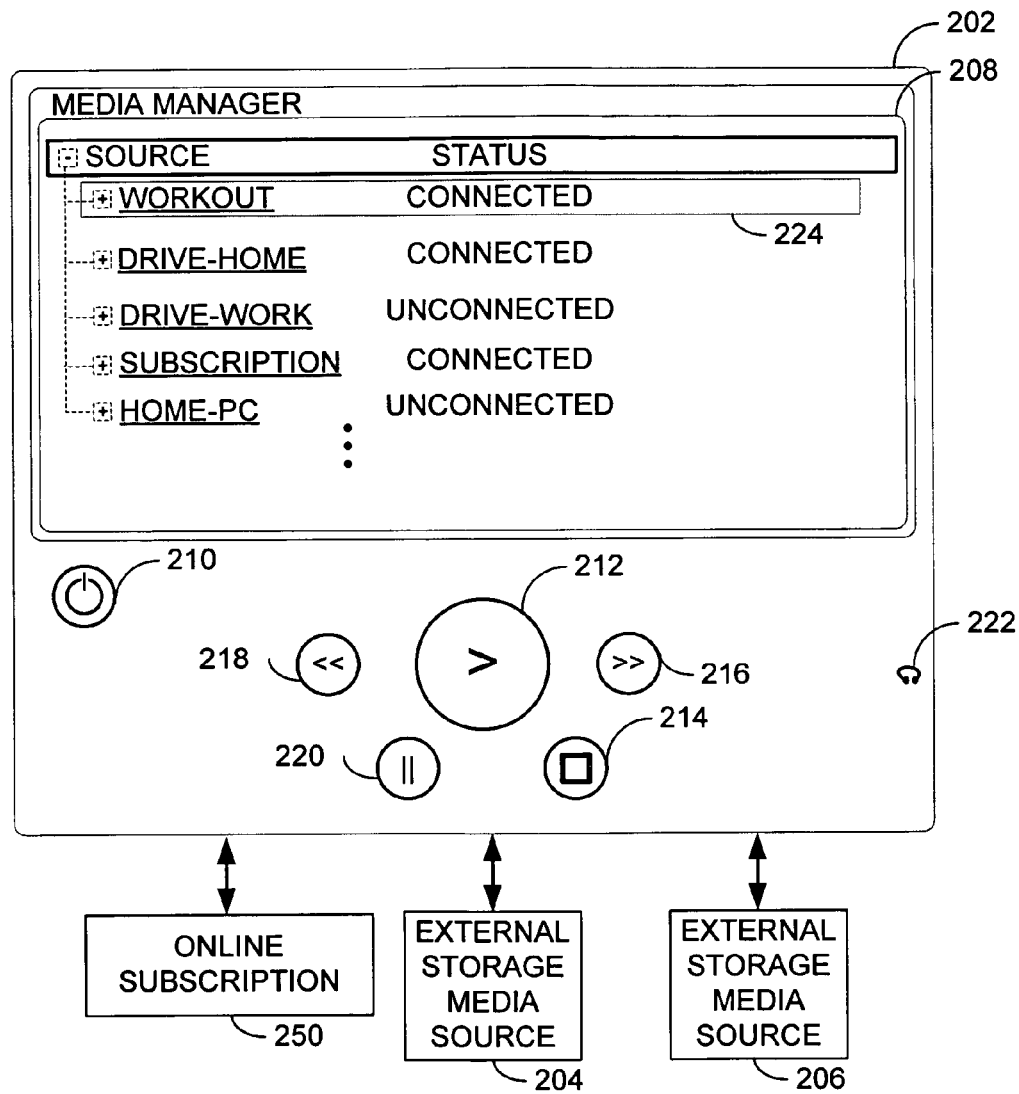
FIG. 2A to 2F are exemplary diagrams illustrating collection discovery of media objects stored in various storage sources according to an embodiment of the invention.

As illustrated in FIG. 2A, computing device 202 provides a display 208 and a set of operational controls, such as a power switch 210, a play button 212, a stop button 214, a fast forward button 216, a rewind button 218, and a pause button 220. The computing device 202 may also provide an audio output plug 222 for headphones. In one embodiment, the computing device 202 may also provide an output to non-wired peripherals, such as Bluetooth headphones, or the like. After a data connection is established between computing device 202 and external storage media sources 204 and 206, and an online subscription 250, collection discovery component 112 recognizes or becomes aware of each of the media sources. In an alternative embodiment, collection discovery component 112 may include a set of routines or codes to recognize external storage media sources 204 and 206, and the online subscription 250.

In yet another embodiment, collection discovery component 112 may provide a configurable component to dynamically determine a set of routines or code through a component registry, XML file, or other technology to recognize external storage media sources 204 and 206. In an embodiment, collection discovery component 112 includes a media source enumerator component to notify collection discovery component 112 when new sources become available or existing sources become unavailable (i.e., when they are removed). In an alternative embodiment, collection discovery component 112 may be extended to provide notification of new media sources based on some triggering event. For example, collection discovery component 112 may notify media user 106 when media user 106 is located close to another user who is broadcasting an electronic offer to share media object contents.

Still referring to FIG. 2A, once collection discovery component 112 recognizes or identifies the media sources (e.g., external storage media sources 204 and 206, and online subscription 250), media manager 140 initially retrieves the name of the media sources and notifies host application 104 that a new source is available. As illustrated in FIG. 2A, display 208 of computing device 202 displays a list of media sources available to the media user 106. For example, display 208 shows a number of media sources, such as "WORKOUT", "DRIVE-HOME", "DRIVE-WORK", "CAR-CD", "SUBSCRIPTION", and "HOME-PC". In addition, display 208 illustrates a status of connection between computing device 202 and external storage media sources, such as "CONNECTED" or "UNCONNECTED".

In one embodiment, collection discovery component 112 may retrieve metadata relating to media information stored in media sources by performing a bind operation between host application 114 of computing device 202 and a media source. For example, the bind operation involves initializing a temporary memory structure with some amount of data from the information stored in the media source. This information may be stored on the media source, such as a simple delimited text file, an XML file, or a binary format specific to a particular database implementation, or some other proprietary binary data storage mechanism. In another embodiment, the information used to initialize the temporary in memory structure may require a conversion of the bind operation or bind requests into a more formal network standard which transfers the requests remotely to another computing device located somewhere on a intranet, internet, or other network. Next, the bind operation is completed when the initialized structure provides a binding between the collection discovery component and the media metadata available on the media source. Following the bind operation the media source typically enters a servicing mode or a stand-by mode. In an alternative embodiment, collection discovery component 112 may perform a bind operation on a media source that also supports some form of indexing or fast retrieval structure or implementation.

Figure 2B:
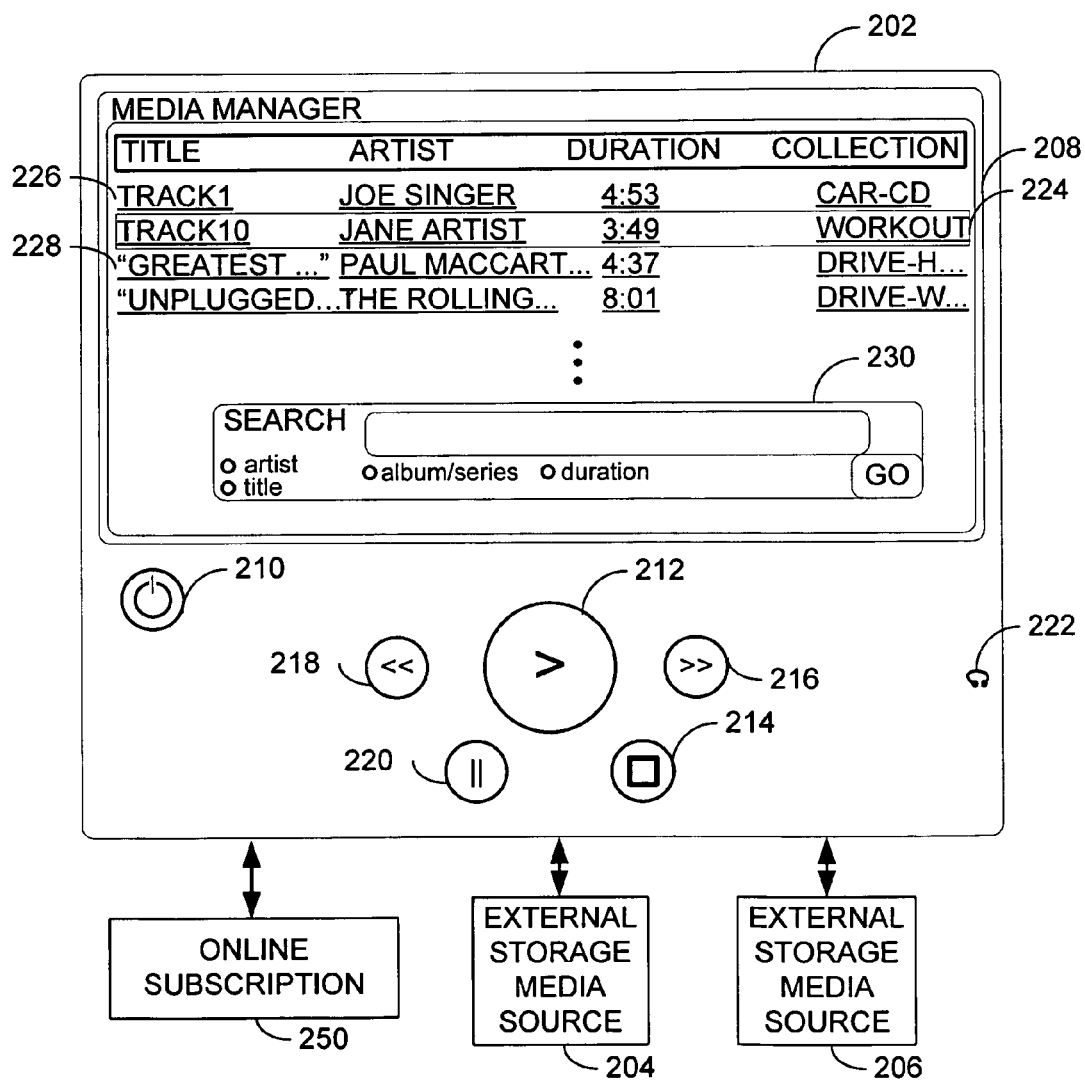

For example, after retrieving metadata from media sources, collection discovery component 112 is in a standby mode or a pure management mode where collection discovery component 112 is to notify host application 104 of changes of media objects on the media sources. In an alternative embodiment, collection discovery component 112 may enter an aggregation mode by aggregating the retrieved metadata to enable host application 104 to present a single result set containing aggregated results across all available media sources rather than a result set representing media information from a single media source, such as shown in FIG. 2B. In addition, media user 106 may also select one of the identified media sources. For example, media user 106 may use fast-forward button 216 or rewind button 218 to move up and down a highlighted box 224 on display 208. In the illustrated example, media user 106 selects the external storage media source "WORKOUT", which may be a removable flash card that has established a wired connection with computing device 202 via collection discovery component 112.

Referring now to FIG. 2B, an exemplary display configuration of media manager 140 for displaying media information based on retrieved metadata from media sources, such as external storage media sources 204 and 206. In particular, collection discovery component 112 is used to identify one or more media objects and collections stored in the media sources and return this resulting metadata using media collection component 114. Once collection discovery component 112 identifies the different media objects and collections, media manager 140 may request additional metadata from the identified media objects, where the metadata is related to media objects stored in the media sources. In an alternative embodiment, host application 134 may elect to present the retrieved metadata to media user 106 with some form of notification or simply wait until the user goes to investigate which sources are available.

For example, as illustrated, a retrieved metadata 226 shows a media object named "TRACK 1" with an artist named "Joe Singer" and with the duration of "4:53" is retrieved from the media source "CAR-CD". Another retrieved metadata 228 indicates a media object named "TRACK 10" with an artist named "Paul MacCart . . . " and with a duration of "4:37" is retrieved from the media source "DRIVE-H . . . ". Also illustrated (shown by the highlight box 224) is a retrieved metadata, selected by media user 106, indicating a media object named "TRACK 10" with an artist named "Jane Artist" and with a duration of "3:49" from a media source "WORK-OUT". By presenting retrieved metadata as illustrated, embodiments of the invention advantageously provide a rich aggregated user experience to media user 106 with a complete and full view of media objects stored in media sources, both local and external, such that media user 106 may easily navigate and locate media objects. In addition, such user experience overcomes shortcomings of prior systems or designs by accommodating a plurality of external storage media sources and building an efficient and compact metadata library in each of the plurality of external storage media sources.

In another embodiment, regardless of the mode (e.g., pure management mode or aggregation mode) that collection discovery component 112 operates, collection discovery component 112 defines a secondary set of APIs enabling consistent access (e.g., query) to the objects, collections, and metadata available in the media sources, either local or remote. In an alternative embodiment, computing device 202 receives a query from a user for querying the metadata and provides a result in response to the received query from the user. As illustrated, a search box 230 is provided to media user 106 for searching media objects managed by collection discovery component 112. In another embodiment, the query language used to communicate between computing device 202 and the plurality of media sources may be as complex as a fully functional query language similar to Structured Query Language (SQL) or as simple as a way to request different pre-defined results based on a couple of variables. In another embodiment, a simple query language may be defined to identify a media source having media information and to establish a set of property restrictions as Boolean expressions. By providing this rich and full user experience, media user 106 may efficiently operate computing device 202 to manage and organize media objects stored in the plurality of media sources.

In an alternative embodiment, collection discovery component 112 of API 102 includes free form query or search to be used across different media sources. For example, the semantics for accessing a local database stored in a local storage media source having metadata information may be quite different from those necessary for requesting information from an external storage media source. By focusing the API on the minimal set of functionality needed to efficiently represent media information, alternative embodiments of the invention build a platform that can scale across a wide range of metadata sources. As such, the minimal set of functionality of the API may be implemented in each media source, either local or external, to map the media sources to whatever semantics that are appropriate for the particular data source. As such, media user 106 may use computing device 202 to conveniently retrieve and query media information stored in the media sources.

In addition, the free form search capability of collection discovery component 112 enables media user 106 to retrieve additional media objects and collections in response to the search. For example, media user 106 may wish to learn, "Which movies are currently playing in the theaters?" Based on this free form search or query, collection discovery component 112 identifies relevant information in response to the search quest. For example, collection discovery component 112 uses a local or remote search engine to search various sources. Upon finding the relevant result, collection discovery component 112 returns the result in the form of a collection using collection management component 114. In one embodiment the returned result may be in the form of a set of uniform resource identifier (URI) or uniform resource locator (URL) that identifies a web site displaying a list of movies that are currently playing the theatres in the media user's region (e.g., based on zip code or address) either by requesting the region from the user or obtaining it computationally from some location service found locally or remotely. Alternatively, collection discovery component 112 may also return a set of URI or URL that leads media user 106 to movie trailers. In yet another embodiment, collection discovery component 112 may return information necessary to present a broadcast guide for a particular distribution medium. For example, the returned information may be necessary for displaying a TV guide to media user 106.

Figure 2C:
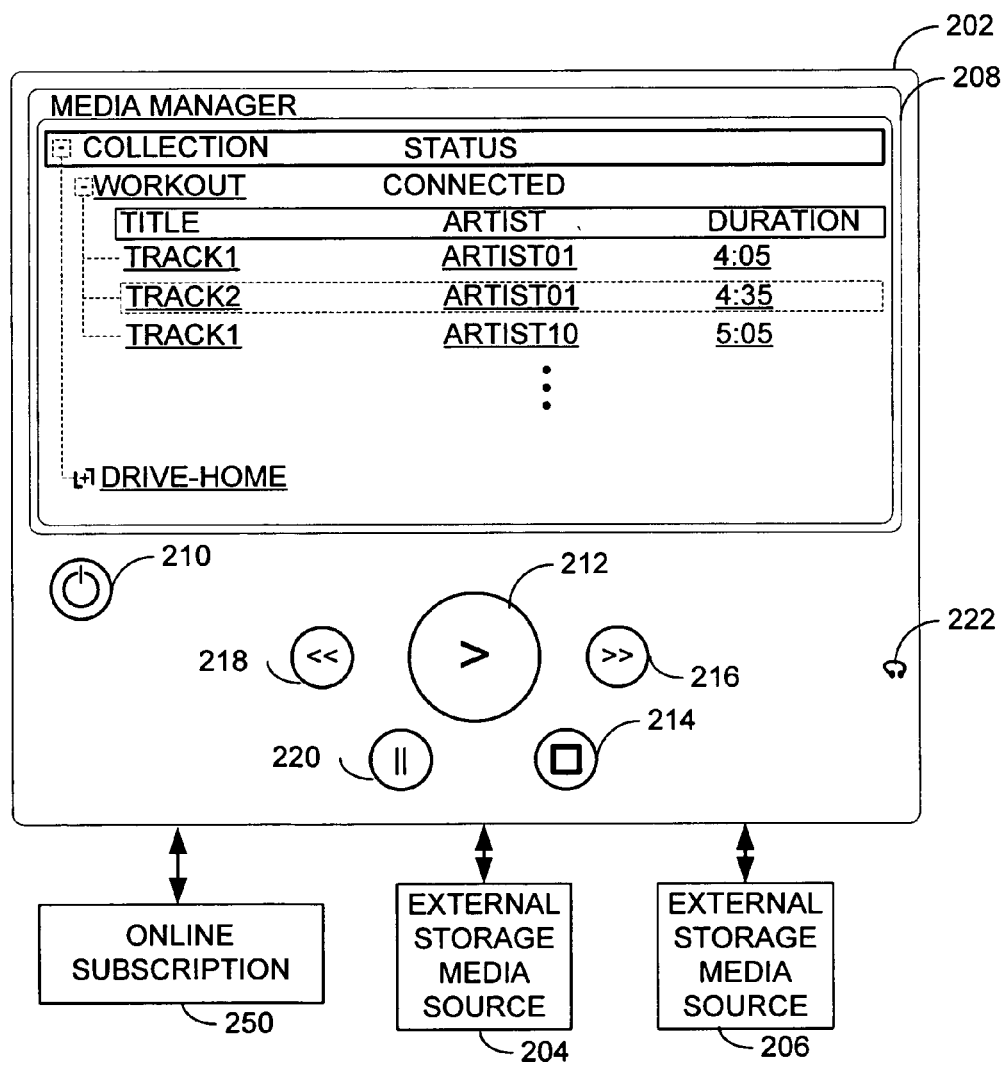

FIG. 2C illustrates another display format of retrieved metadata according to an embodiment of the invention. In particular, media manager 114 displays aggregated metadata according to the media sources. For example, the illustrated example shows that the media objects of a media source "WORKOUT" are displayed. In one embodiment, the displayed metadata may be ordered by different fields, such as by artist, title, duration, etc. In another embodiment, the displayed metadata may be ordered by a frequency of a usage preference of media user 106. In an alternative embodiment, collection discovery component 112 resolves duplication of media objects when aggregating the retrieved metadata as a function of the usage preference. For example, suppose there are two sources, such as "WORKOUT" and "CAR-CD" that include an identical media object such as TRACK1 by ARTIST01. The collection discovery component 112 may determine that "WORKOUT" is a preferred media source because media user 106 uses the "WORKOUT" media source more often than the "CAR-CD" media source. As such, "TRACK1" by "ARTIST01" of the "WORKOUT" media source may be displayed first.

In one embodiment where there is only one media source, either local or external, storing media objects, media manager 140 may organize the displayed metadata as an ordered list, un-ordered list, or other format that may be defined by the media source.

Figure 2D:
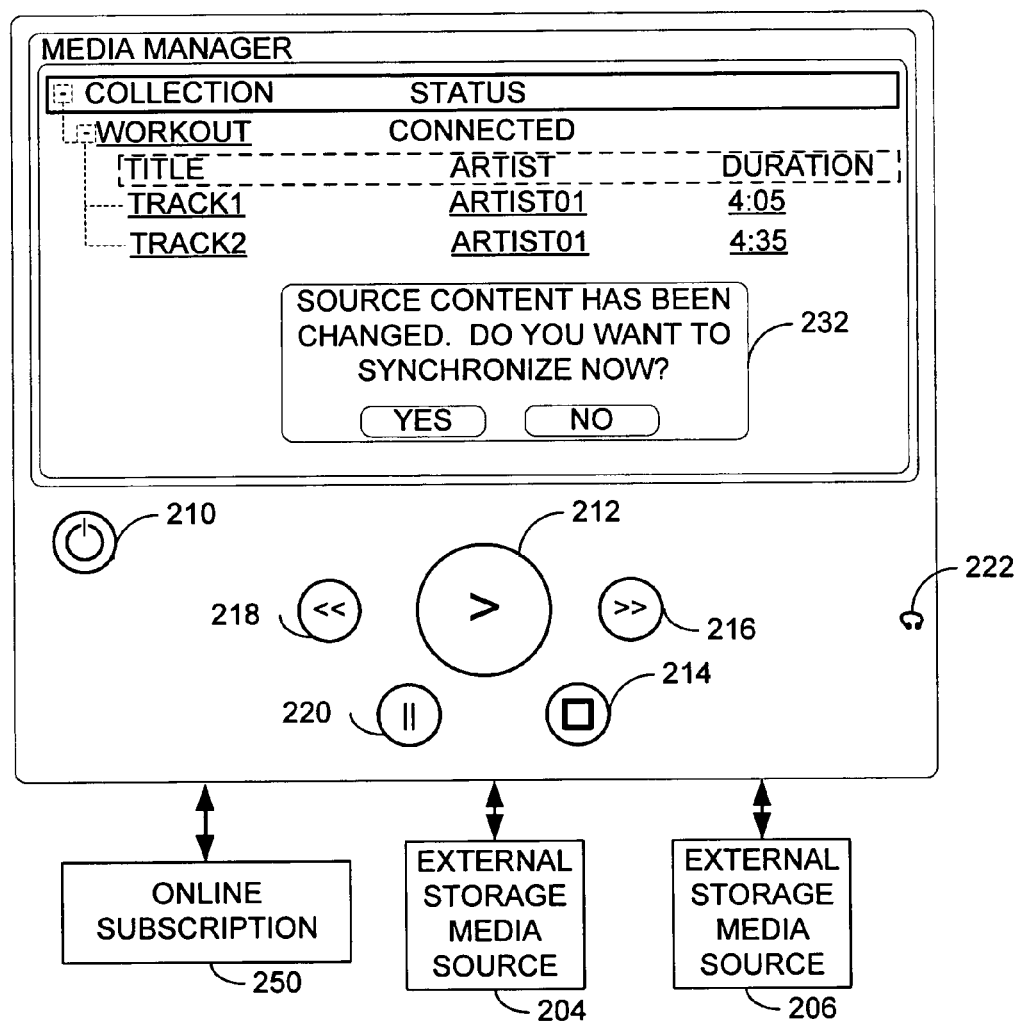

In an alternative embodiment, collection discovery component 112 may cause the consistency of one or more media sources to be validated in an effort to detect changes to contents in the one or more media sources. For example, as discussed above in the standby or pure management mode, FIG. 2D illustrates a synchronization notification dialog box 232 notifying media user 106 whether to synchronize the aggregated metadata displayed on computing device 202 to reflect the changes in the media source. In this operation, the contents of one or more of the media sources may be read by the collection discovery component 112, and the metadata extracted may be used to update the information available from the media source. In another embodiment, the collection discovery component 112 may cause a media source to enter a data validation mode in which the collection discovery component 112 performs a heuristic scan of the media source looking for changes to the contents by referring to information such as creation or modification date for a particular media object or collection.

In yet another embodiment, the media source may be presented with a transaction log or other organizational structure that lists the changes made to the media represented by this media source. The media source may then parse the transaction log or change list and perform the necessary updates to the metadata information stored on the removable device for the media that has changed. In an alternative embodiment, collection discovery component 112 may issue a command via the media source to a remote media storage source to request that the remote source validate the consistency of the metadata against the available media.

Figure 2E:
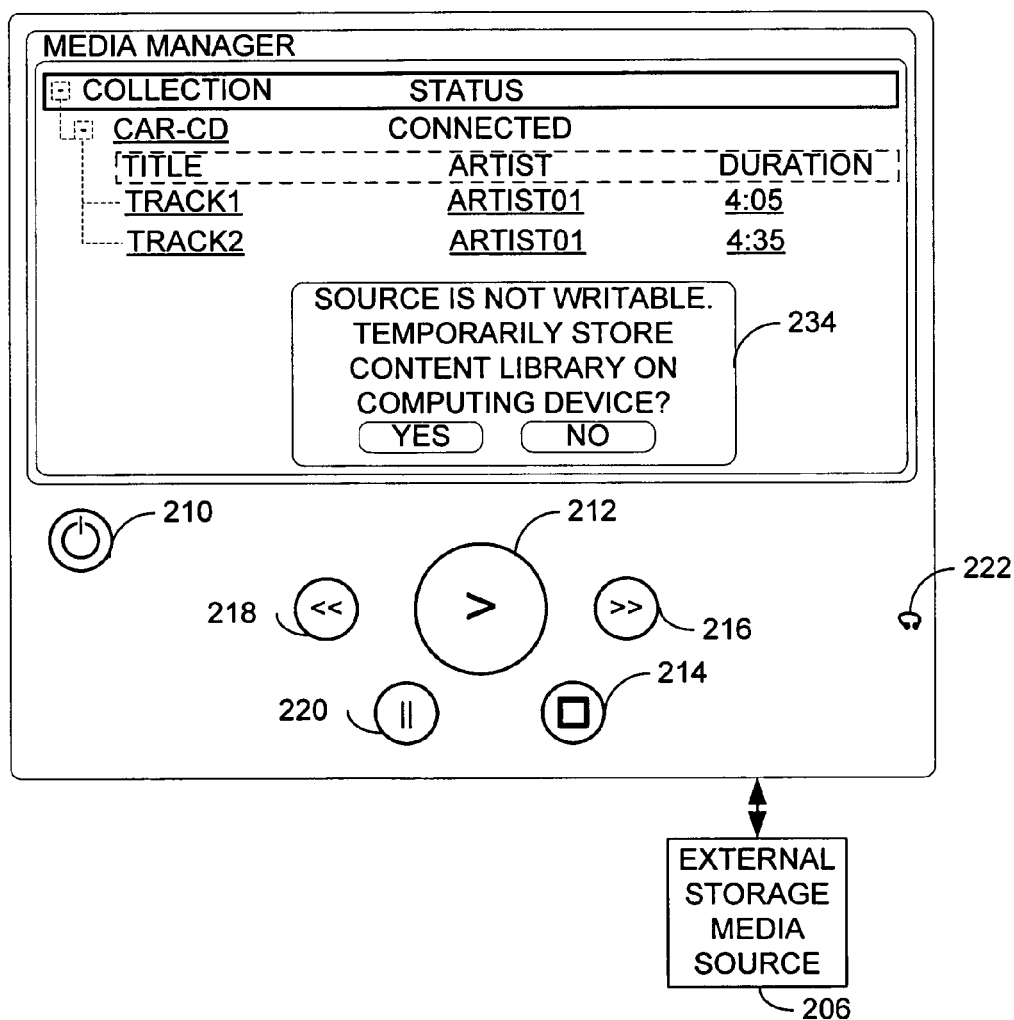

In yet another embodiment, media manager 140 may also notify media user 106 when one or more external storage media sources is not writable. For example, FIG. 2E illustrates a dialog box 234 to notify media user 106 that the media source is not a writable/re-writable storage media source. The media user 106 is next asked to permit temporarily storing content library on computing device 202. In another embodiment, a read-only implementation of the invention may be created to handle support query and other functionality of the read-only media source (e.g., a non-rewritable CD-ROM) without requesting permission from the user.

For example, if the user attempts to modify the contents of the metadata on the read-only media source or device, the user is informed that this is not possible and is prevented from making the changes. In this embodiment, the media source is responsible for examining the contents of the removable read-only memory and building up the necessary metadata based on parsing the contents of the media. In another embodiment, the media source may take advantage of a remote metadata repository (e.g., remote network storage media source) capable of reporting metadata based on serial number or some other identifying piece of information that can be extracted from the read-only storage media.

In a further alternative embodiment, when the media library or the organized media structure on one of the external storage media sources exceeds or is close to the storage capacity of the external storage media source, the alternative embodiment of the invention dynamically enables the media user 106 to browse through all available storage media sources to find the media object in each of the storage media sources before referencing the media object in the media library on the storage media source.

In yet a further embodiment, collection discovery component 112 may dynamically adjust speed of retrieving or aggregating metadata from one or more external media sources to achieve optimal user experience characteristics. In this particular embodiment, during retrieval of metadata, collection discovery component 112 returns some basic information about a specific set of results without actually returning the full result set. For example, if media user 106 is connected to a network based external storage media source over a relatively slow connection (e.g., dial-up), collection discovery component 112 may optimize the network traffic to provide the best possible user experience. In another example, for a large set of retrievable metadata, collection discovery component 112 may initially return information about the number and type of objects available, and only return the name or other details of the media objects upon demand from media user 106, such as when media user 106 presses the play button.

Figure 2F:
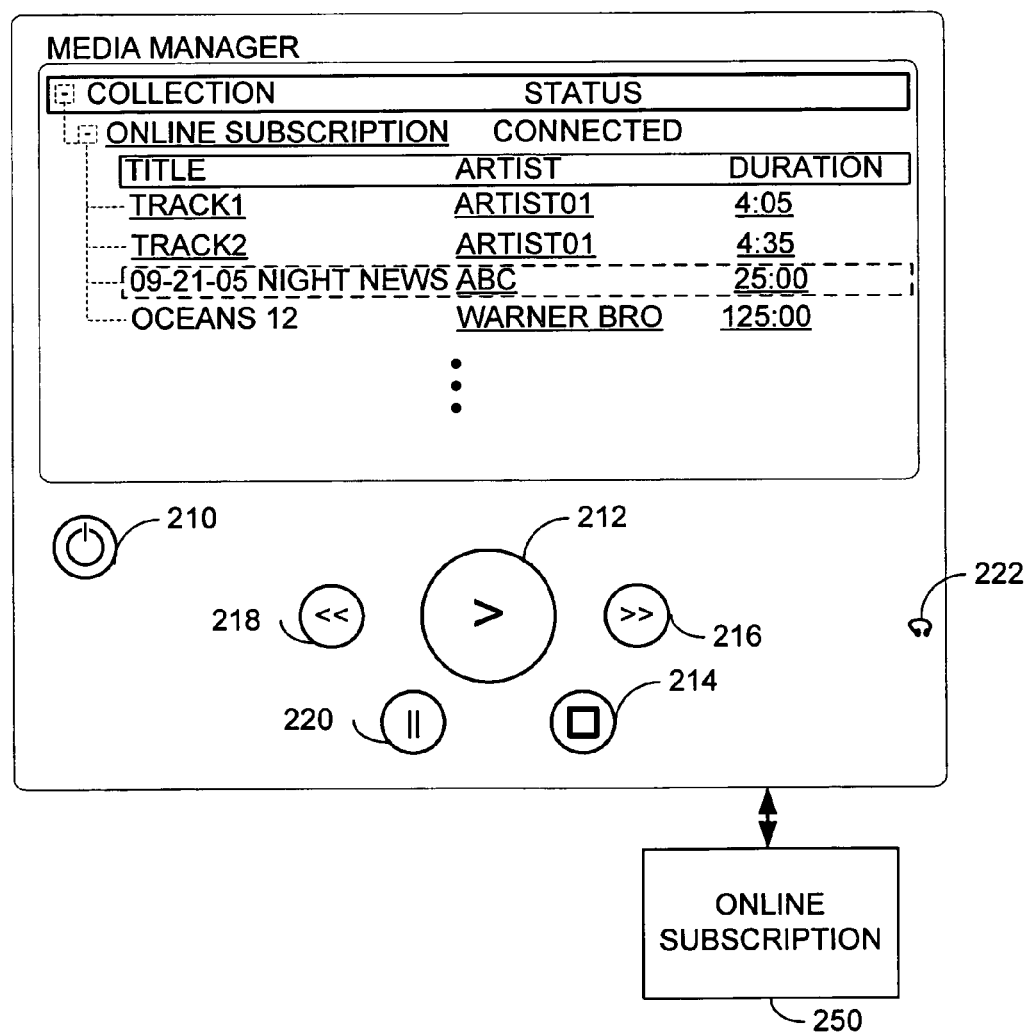

In one embodiment, collection discovery component 112 identifies media objects from a source, such as online subscription 250, as illustrated in FIG. 2F. In one example, the online subscription source 250 may be an online music store, an online streaming source, a broadcasting source, or a media source where media content is available through some form of synchronization process. As illustrated, media user 106, according to its subscription, has access to "Track 1" and "Track 2" from "Artist01", "9-021-05 NIGHT NEWS" from "ABC", and "OCEANS 12" from "WARNER BRO." The media manager 140 enables media user 106 to manage sources to which he currently subscribes via the collection discovery component 112. In this example, media user 106 selects "09-21-05 NIGHT NEWS," which will be represented in the form of a collection according to the structure described below.

Other display configurations or formats, apart from those illustrated in FIGS. 2A-2F, may be implemented without departing from the scope of the invention. In addition, other media information fields, such as artist, album/series, and/or title, may be organized appropriately without departing from the scope of the invention. In addition, media manager 140 or collection rendering component 116 may perform one or more of the following operations: enabling media transport, manipulating the state of one or more output devices, obtaining state information pertaining to rendering, and sending event notifications of different states during rendering.

FIGS. 3A to 3H are exemplary diagrams illustrating a representation of media object 108 or media collection 126 according to an embodiment of the invention. In one embodiment, media collection component 114 organizes media objects identified by collection discovery component 112. In another embodiment where media objects are first created based on the model of API 102, media collection component 114 also organizes media objects according the descriptions below.

Figure 3A:
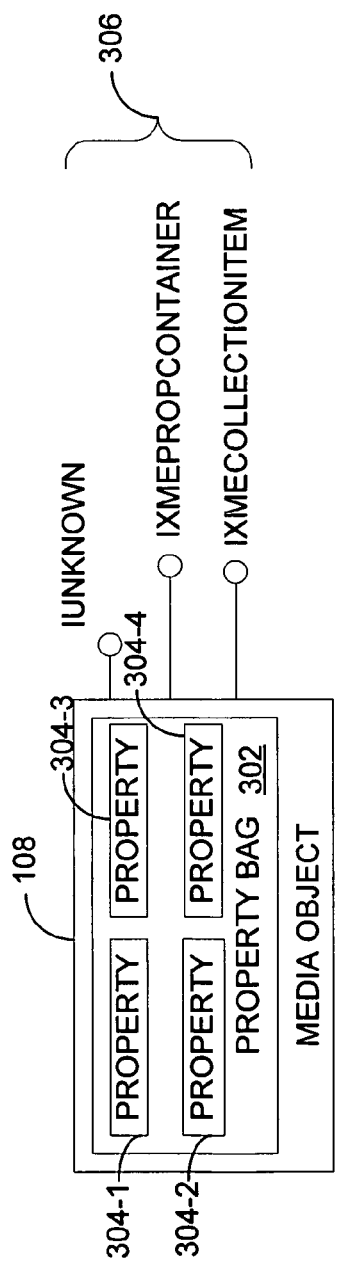
FIGS. 3A to 3H are exemplary diagrams illustrating a representation of media objects according to an embodiment of the invention.

FIG. 3A is a diagram illustrating an exemplary representation of media object 108 according to an embodiment of the invention. For example, media object 108 includes a property bag 302 having one or more properties 304. Unlike traditional approach of representing media objects, each of properties 304 under embodiments of the invention is accessible to a client (e.g., media player application 110) and is dynamically presented to the client based on a set of rules. The properties 304 include information such as the title, length, size, or other data related to media object 108; metadata; or other computed data of media object 108. In addition, each of the properties 304 is exposed via methods in interfaces 306 so that these properties may be read and/or written. For example, a method in interface IXMEPROPCONTAINER may expose the values or parameters of each of the properties 304; a method in interface IXMECOLLECTIONITEM may expose an array of property values from media object 108 instead of just one value at a time. Appendix A illustrates additional and exemplary functions used to expose properties 304.

In one embodiment, each of the properties 304 is represented as a variant type allowing only a single read and write method for all properties 304. Alternative embodiments may specify a particular property processing method. In a further embodiment, each of the properties 304 may have specialized rules or parameters associated therewith. For example, some properties may be read-only and some may only be available under certain conditions, etc.

In an alternative embodiment, multiple properties 304 may be retrieved or written in a single operation. In addition, when there is a change to the properties 304, embodiments of the invention enable clients to respond to the changes (e.g., by identifying metadata changes or changes in the parameters or values in the properties 304) through a notification.

Figure 3B:
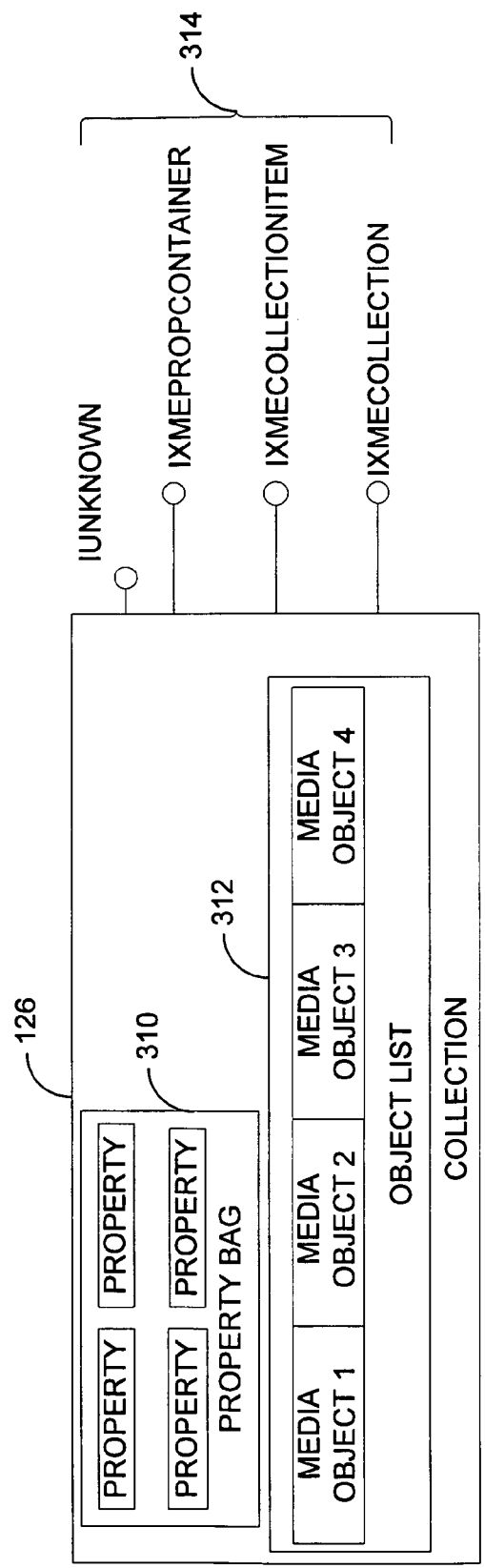

FIG. 3B illustrates an exemplary representation of a media collection 126 according to an embodiment of the invention. As described above, the media collection 126 is a collection of zero or more media objects 108. As such, media collection 126 includes a set of properties 310 and a set or list of media objects 312. In another embodiment, media collection 126 is also treated as a media object so that it can be manipulated as a media object. The media collection 126 also includes a set of interfaces 314 to expose the properties and functionality associated with collections. For example, IXMEPROPCON-TAINER function may expose the values or parameters of the set of properties 310 to the client. Methods on interface IXMECOLLECTIONITEM may expose an array of property values from collection 126 instead of the single property values available through IXMEPROPCONTAINER, or the like. Methods on the interface IXMECOLLECTION may expose the number of items in the set of objects 312 to the client. Other methods on IXMECOLLECTION may expose the ability to add or remove items from the object list 312. Additional functionalities and functions may be added or supplemented to the structure represented above without departing from the scope of the invention.

Figure 3C:
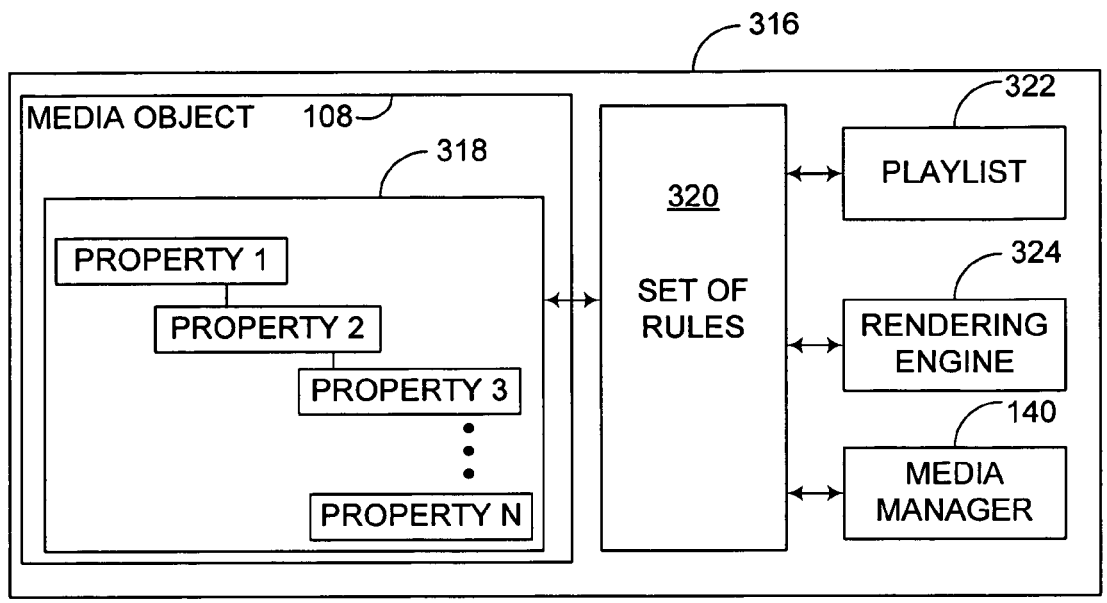

FIG. 3C describes a basic structure 316 for representing media object 108 according to an embodiment of the invention. As described above, each media object 108 includes one or more properties 318 and the properties 318 are exposed to the client (e.g., external application programs, operating systems, another API, or the like) based on a set of rules 320. The set of rules 320 include rules such as, order of precedence for where properties are to be extracted from, requirements for certain properties to be dynamically calculated, a set of business rules, or the like. Based on the set of rules 320, a set of additional values or properties may be used instead of the properties actually associated with media object 108. The additional properties may come from the playlist 322 in which media object 108 is associated, the rendering engine 324, or properties which come from an alternative source such as the media manager 140. The set of rules 320 may specify that the properties in 318 are to be replaced, added to, or subtracted by the rule evaluation process.

For example, suppose media user 106 downloads a media collection, such as a video playlist from an online news organization that includes an 15-second or 30-second commercial advertisement and the actual news story. While prior APIs would easily make the properties (e.g., name, title, album, genre, pricing, or the like) of the individual video files available to a digital media player application, embodiments of the invention expose additional or alternative properties from the playlist to the digital media player application or directly to the user by dynamically evaluating the set of rules 320. In this playlist file example, the API 102 evaluates a rule that governs online downloadable files by retrieving the playlist via the uniform resource identifier (URI) or the uniform resource locator (URL) and storing the properties in the playlist 322. Typically properties that appear in the playlist include items such as a human readable title for the item, an alternate assignation of authorship (e.g. the news agency instead of the reporter), or other properties based on business requirements. Under this embodiment the properties defined by the playlist may overrule other properties associated with the collection. For example, the title assigned by the news organization is displayed instead of the original property authored by the reporter.

Figure 3D:
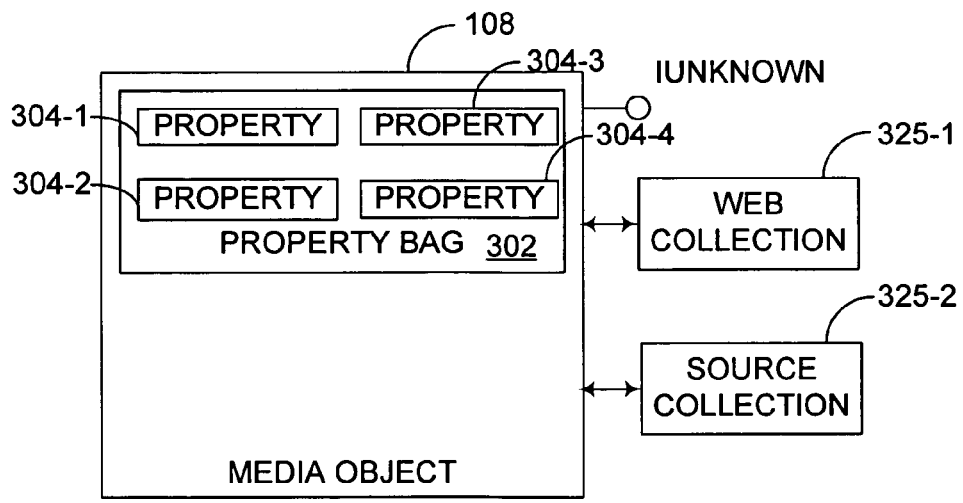

In another embodiment, the set of rules 320 governs whether entire media objects are hidden or not exposed to the media player application 110. For example, the existence of a playlist 322 may indicate that a URL to a remote playlist was used as the source for the playlist. Based on the set of rules all of the contents of the playlist may be hidden from the user in such a manner that only the title of the playlist appears. In this example, when the playlist is resolved (e.g., downloaded from the remote location), it is parsed locally to gain access to the media objects associated therewith. Instead of making the media objects in the playlist available as a node in a collection structure (to be discussed in FIG. 3E), the media objects or the collection of media objects represented by this remote playlist is attached to the media object 108 as part of a web collection 325-1 as shown in FIG. 3D. To users of API 102 it appears as if the media object 108 that is sourced from the remote playlist is a single object with the properties of the remote playlist itself. In one embodiment, access to the items in the web collection is restricted from view by users of API 102. Alternative embodiments may make the contents of the remote playlist fully available to users of API 102.

Still referring to FIG. 3D, in another example, media user 106 may wish to view a movie trailer streaming file on the Internet. In addition, the movie trailer file may also be treated as a media collection or a collection of media objects which includes the content of the movie trailer, a 30-second or 15-second commercial to be rendered before and/or after rendering the movie trailer content, or the like. As represented by embodiments of the invention, the movie trailer playlist file would include the set of source information for each media object, the commercial and the trailer, such as one ore more locations where the media object may be streamed from in the form of one or more URIs or URLs. According to rules of evaluation during playback the first URL specified in the source collection for a particular media object would be selected and an attempt would be made to playback the content from this remote location.

If the content was unavailable at the specified remote location, the next URL in the list would be attempted. This process would repeat until either the media contents are located at the remote location or the list of possible locations is exhausted. If a valid source location fails to be located playback continues with the next media object in the collection. As such, this exemplary implementation of a source collection 325-2 enables remote playlists or remote media objects/collections to indicate more than one potential source for a piece of content so that, when the media object or collection is downloaded to the media user's computing device, media objects in the collection may be loaded based on a server's availability or, if appropriate, load balancing of the servers network connection determined by the remote location. In one embodiment, such sequencing or load arrangements in the source collection 325-2 may be hidden and not exposed or represented to media user 106. Alternative embodiments may expose the different URLs available in source collection 325-2 to media user 106. In another embodiment, the source collection 325-2 may apply to local objects as well as remote objects.

Figure 3E:
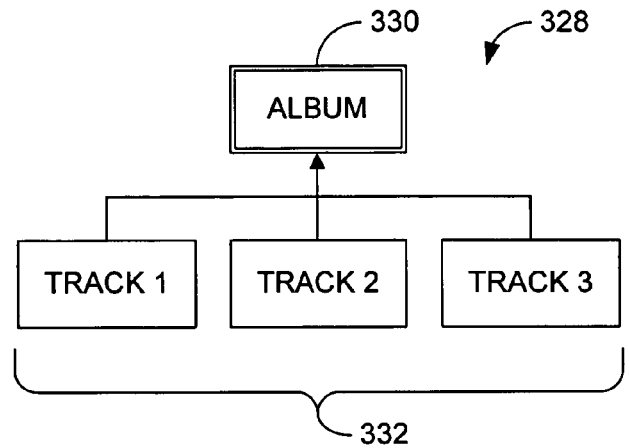

FIG. 3E illustrates a fundamental hierarchical collection structure 328 of media objects as a media collection. The traditional approach is simply to create an array of media objects and treat the array as a media collection. In some cases, this linear organization scheme further degenerates into creating a list of metadata about the object (e.g., an array of file names for example) rather than maintaining an actual list of the objects. This results in having to recreate the object when it is accessed during runtime.

Unlike such traditional approach, implementations of embodiments of the invention diverge from traditional approaches by representing media collections as media objects. The collection structure 328 represents the media collection including a list of the objects itself. The media collection is capable of reporting to clients the number of objects in the collection as well as providing access to the individual elements in the collection without the need to provide additional resources (e.g., memory access, processing, or the like). As such, the collection structure 328 includes a root node 330 representing an album media collection. The album media collection in term includes one or more children nodes 332, which represent "Track 1", "Track 2," and "Track 3." Each of which, as a media object, includes properties (which also include metadata of each of the tracks), the set of rules, the web collection, the source collection, and the inheritance collection, as described above in FIGS. 3A to 3D. Unlike the traditional linear approach, the album collection includes properties (which may include metadata of the album collection), the set of rules, the web collection, and the source collection.

Figure 3F:
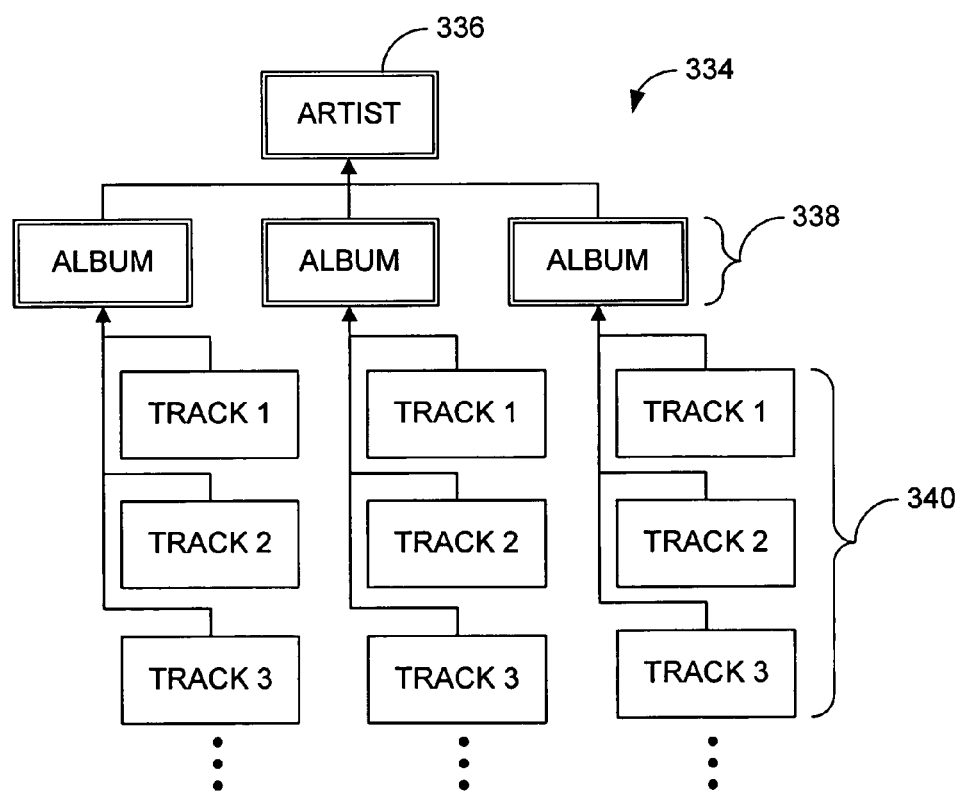

Similarly, FIG. 3F illustrates another collection structure 334 representing a media collection 336 representing media objects belong to an artist, such as The Beatles. The collection structure 334 includes a number of child nodes 338 representing one or more albums in media collection 336. Each of the child nodes 338 also includes nodes representing one or more tracks belong to the respective album. As noted above, each representation of the tracks, albums, and artist includes properties (which also include metadata of each of the tracks), the set of rules, the web collection, and the source collection. The associated metadata for each of the tracks is available from the media objects while metadata about the album itself is available from the media collection. In a further example, a media collection of all albums by a particular artist is represented by simply creating a new media collection, adding this particular album to the new collection along with collections representing each of the other albums by this artist.

Figure 3G:
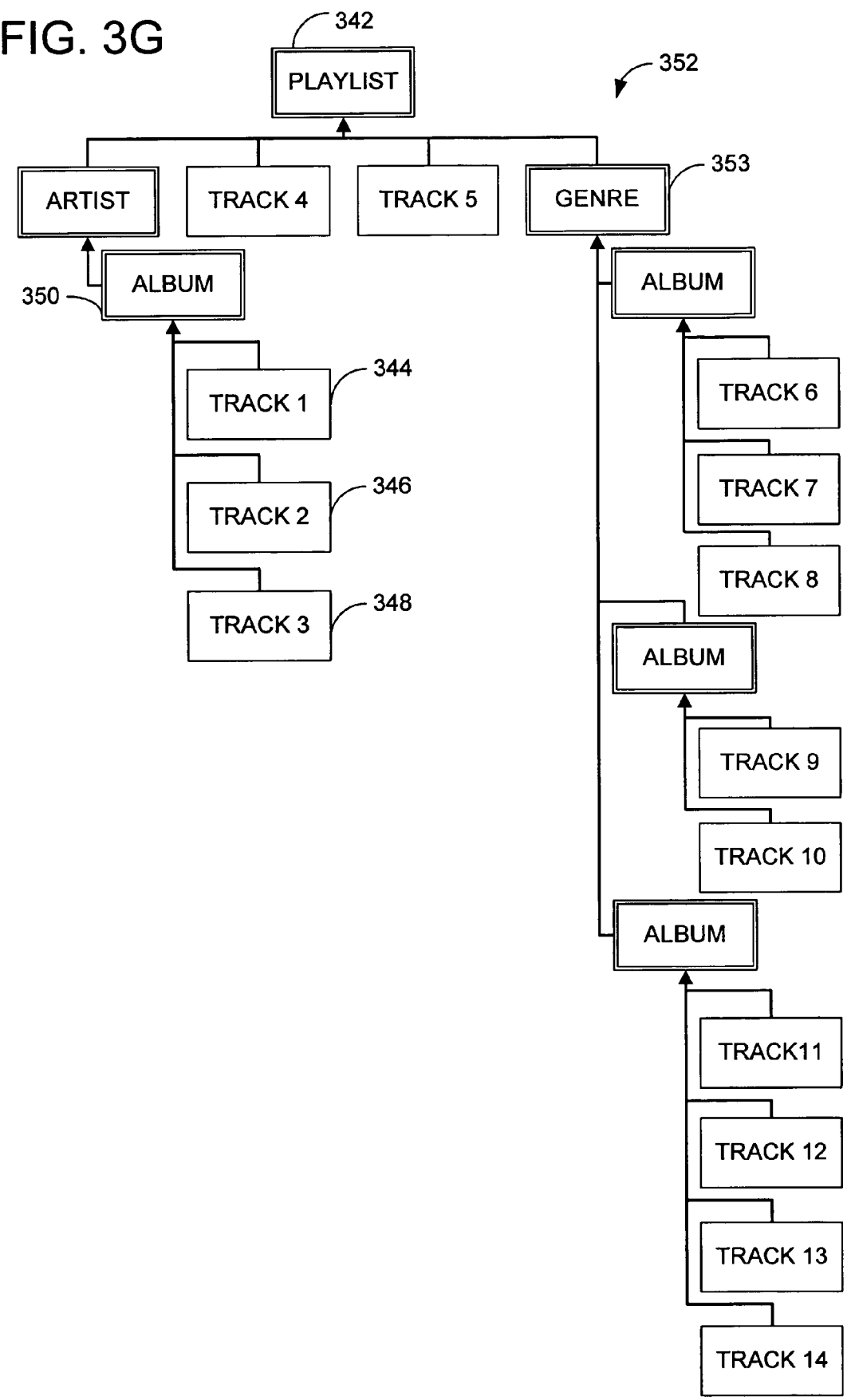

In one embodiment the hierarchical structure and the exposed properties of media objects of API 102 are augmented to enable properties to be retrieved from media objects during rendering in a linear fashion as opposed to a hierarchical fashion. FIG. 3G illustrates an exemplary implementation using a playlist 342 in a collection structure 352. While it is natural to express all tracks by a particular artist in using the collection structure 352 described above, when media user 106 actually attempts to play this playlist 342, media user 106 is more interested in the list of tracks than the list of albums or the name of the artist. Suppose media user 106 wishes to playback the playlist 342, which includes tracks 1 to 14. As illustrated in FIG. 3G, Track 1 344, Track 2 346, and Track 3 338 belong to album 350. In this example, the root of the collection structure 352 is enabled to report its children as the leaf nodes of the collection structure rather than its immediate children. In this implementation, there is also no requirement that all of the leaf nodes are at a particular depth in the collection structure 352, as shown in FIG. 3G.

While the collection structure 352 shows the hierarchical structure, the designs and implementations of media objects illustrated in FIGS. 3A to 3D enable the collection structure 352 to optimize property retrieval from individual nodes in the hierarchy. As such, in returning properties for objects included in playlist 342, embodiments of the invention does not need to instantiate the Track 1 object 344 before making properties available from the object. In addition, an object for a genre 353 is not required to be instantiated in order to retrieve properties from objects which are not its children. In another example, this implementation improves time spent in accessing object properties when they are being retrieved from a data store like a database rather from in memory objects (e.g., memory cache). In a memory constrained device implementation (e.g., system 130), this implementation avoids having to create the individual media objects until they are actually needed for some operation that cannot be performed in prior systems via the access functions. The end result of this optimized implementation is that it is possible to create high performance user interfaces without requiring that all objects being represented are actually instantiated in a memory cache.

Therefore, regardless of how extensive or arbitrary a media collection may be, each media object is organized and represented with extensible properties and metadata such that random or arbitrary groups of media objects would not create additional processing or resource burden on the system.

Figure 3H:
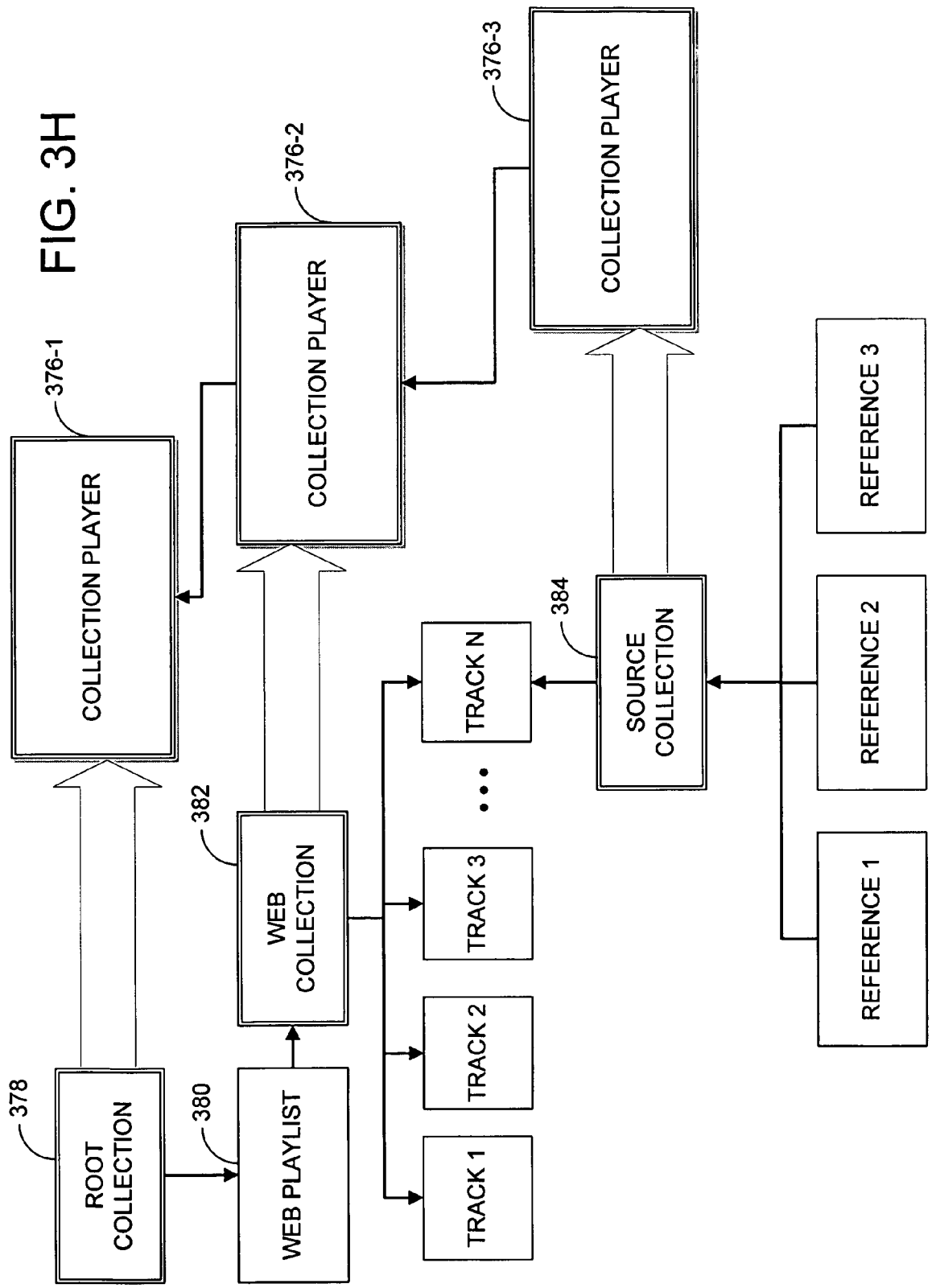

Referring to FIG. 3H, a block diagram illustrating an implementation of collection rendering component 116 for rendering media objects according to an embodiment of the invention. The collection rendering component 116 interfaces with media collection component 114 and receives the organized media objects so that the contents of the media objects are rendered. In one embodiment, collection rendering component 116 includes two parts: an object (or stream) player (not shown) and collection players 376.

In one example, an object player is responsible for playing a specific stream of media. In this example, an object player renders a media file that is in a MP3 format. The object player provides control methods to enable media playback operations (playing, pausing, seeking, etc.), manipulates the state of output devices, or receives state information about playback. The object player may also send events to registered listeners to provide notifications of different states during playback. In another embodiment, the object player may be adapted to accommodate another format or media platform so that media files or objects in any platform or format may be rendered.

Still referring to FIG. 3H, the collection players 376 render all of the media objects in the collection in some order. In one embodiment, collection players 376 include standard playback modes, such as a simple linear playback (from the first to the nth object) or shuffled playback. In another example, collection players 376, like the object player, have methods for controlling the playback state, manipulating the state of output devices, receiving state information about playback, or sending events about states of collection players 376 as well as forwarding some of the events from the individual object player.

In an alternative embodiment, each of collection players 376 is also an instance of an object player. This enables playback of complex collections to be handled by stacking collection player 376-1, 376-2, and 376-3. For example, in playback or rendering of a set of complex web playlists, an initial collection player 376-1 is created or instantiated to play a root collection 378 containing one media object (i.e., a web playlist 380). When the web playlist 380 is resolved, web collection 382 is attached to the media object representing the web playlist 380. To begin playing the web collection 382, a child collection player 376-2 is created or instantiated to play web collection 382. As this child collection player 376-2 renders media files in web collection 382 (i.e., Track 1, Track 2, Track 3, or the like), it may encounter an entry (e.g., Track N) that has a source collection 384. To play this source collection 384, another instance of a child collection player 376-3 is created or instantiated and is asked to play source collection 384 using the rules applicable to source collection 384. By this cascading and stacking implementation of one or more instances collection rendering components 116, embodiments of the invention efficiently re-use codes or processes of the collection players 376 to handle playback across the complex playlist.

In an alternative embodiment, in addition to sequencing playback, the collection player 376 handles format resolution (i.e., discovering the format of a particular piece of content), object to player binding (e.g., associating an object with an object player capable of playing the format), and object player lifetimes (e.g., including concepts, such as pre-roll). For example, the collection player 376-1 manages the lifetime of web playlist 380 during playback runtime. In this scenario, an object for the web playlist 380 is instantiated and resolved to a particular format. Collection player 376-1 will keep the item valid while all child collection players 376-2 and 376-3 render their respective collections. In the case of collection player 376-2, the collection player 376-2 also performs additional management of the playback experience to make sure that a seamless presentation is achieved. In one embodiment to obtain such a presentation when multiple tracks are being rendered, a method pre-rolls the next track in the list so that it is prepared to play the moment the current item is completed. In this embodiment, collection player 376-2 is charged with detecting the correct moment during playback of the current track to initiate pre-roll on the next track in the collection.

Figure 4:
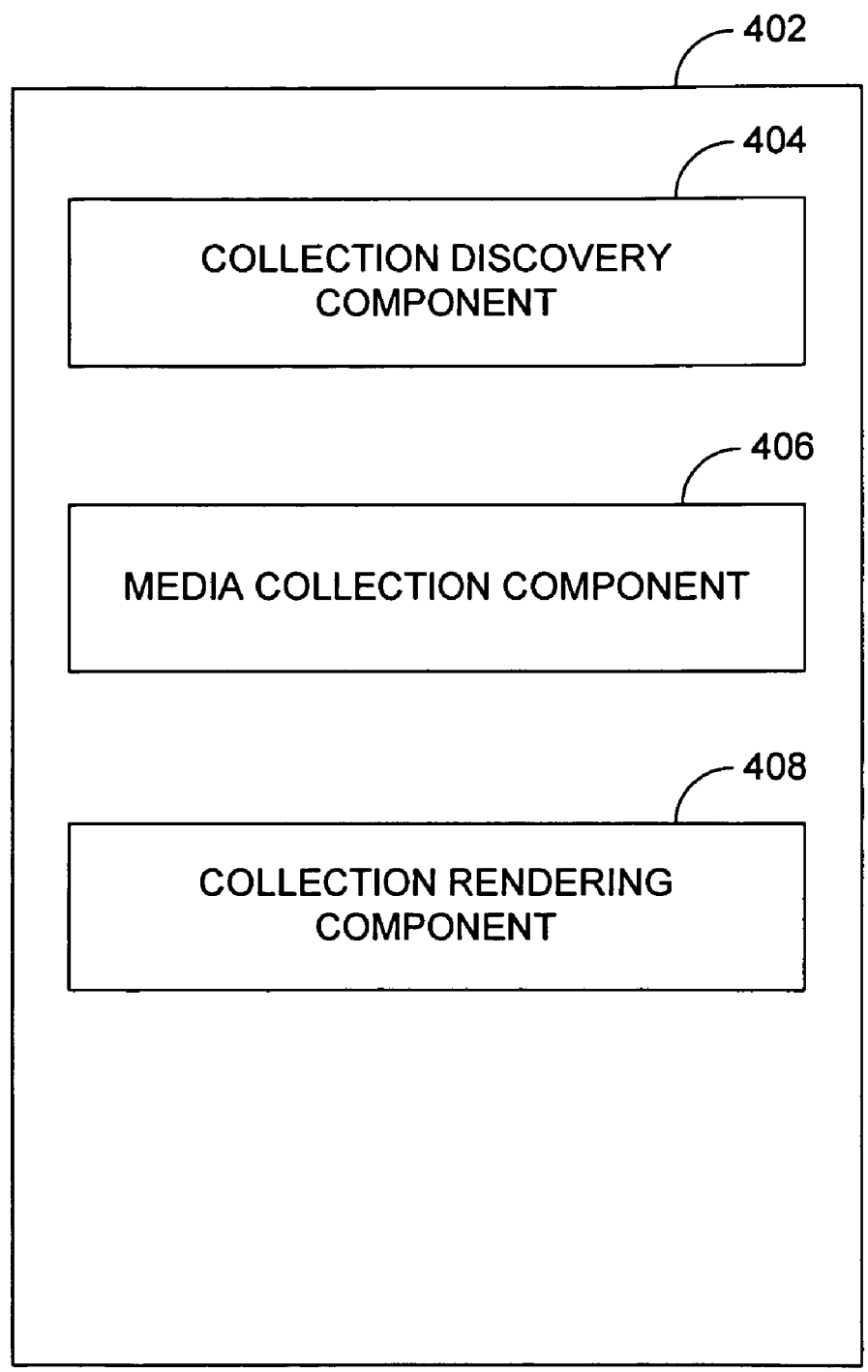
FIG. 4 is a block diagram illustrating an exemplary computer-readable medium on which the invention may be stored according to an embodiment of the invention.

FIG. 4 is a block diagram illustrating an exemplary computer-readable medium 402 on which the invention may be stored according to an embodiment of the invention. The computer-readable medium 402 includes a collection discovery component 404 for selecting one or more media objects for a collection (e.g., media collection 126) or a preset collection in the form of a playlist or some other collection of objects. The collection has metadata associated therewith. In one embodiment, the collection discovery component 112 is enabled to send notifications of changes in the number or availability of media sources. The computer-readable medium 402 also includes a media collection component 406 for defining and managing a plurality of objects. The objects include at least a media object (e.g., media object 108) and a collection object (e.g., media collection 126). The media object is representative of one of the media objects in the collection and the media object includes a property representative of metadata associated with said one of the media objects in the collection. The collection object includes a property representative of metadata associated with the collection. The computer-readable medium 402 further includes a collection rendering component 408 for exposing the objects to the user via some form of media player application for performing one or more operations on either the media object property or the collection property or both.

In another embodiment, the media collection component 406 is further configured to define a set of rules for the media object property or the collection property, and is further configured to dynamically expose the one or more operations for the media object property or the collection property as a function of the defined set of rules. In yet another embodiment, the media collection component 406 is further configured to provide a notification when one or more of the properties of the media object are modified. Alternative embodiments include a collection rendering component 408 capable of rendering the contents of a media collection 126. In an alternative embodiment, the collection rendering component 408 is further configured to parse a playlist locally at the computer to resolve the playlist for rendering the remote media objects by the media player application. Alternative embodiments enable the collection rendering component 408 to send notifications about the rendering state and other aspects of the rendering process.

In a further embodiment, the media collection component 406 is further configured to organize the media collection in a hierarchical structure where the media collection includes the one or more media objects, and each of the one or more media objects in the collection is defined based on one or more of the following: sharing at least one common feature based on metadata associated with the media objects or defined by some other user defined criteria (e.g. the pseudorandom group of music that user 106 likes to listen to while working out). In another aspect of the invention, the collection rendering component 408 is further configured to dynamically expose the media object property or the collection property without exposing the media object or the collection represented thereby.

In yet another embodiment, at least one computer-readable medium (e.g., computer-readable medium 402) has a data structure stored thereon, where the data structure comprising a media object representative of a media item, said media object including a plurality of properties, at least one of said properties of the media object being representative of media content of the media item, at least another one of said properties of the media object being representative of metadata associated with the media item, said media object being exposed to a media player application for performing one or more operations on the properties.

Figure 5:
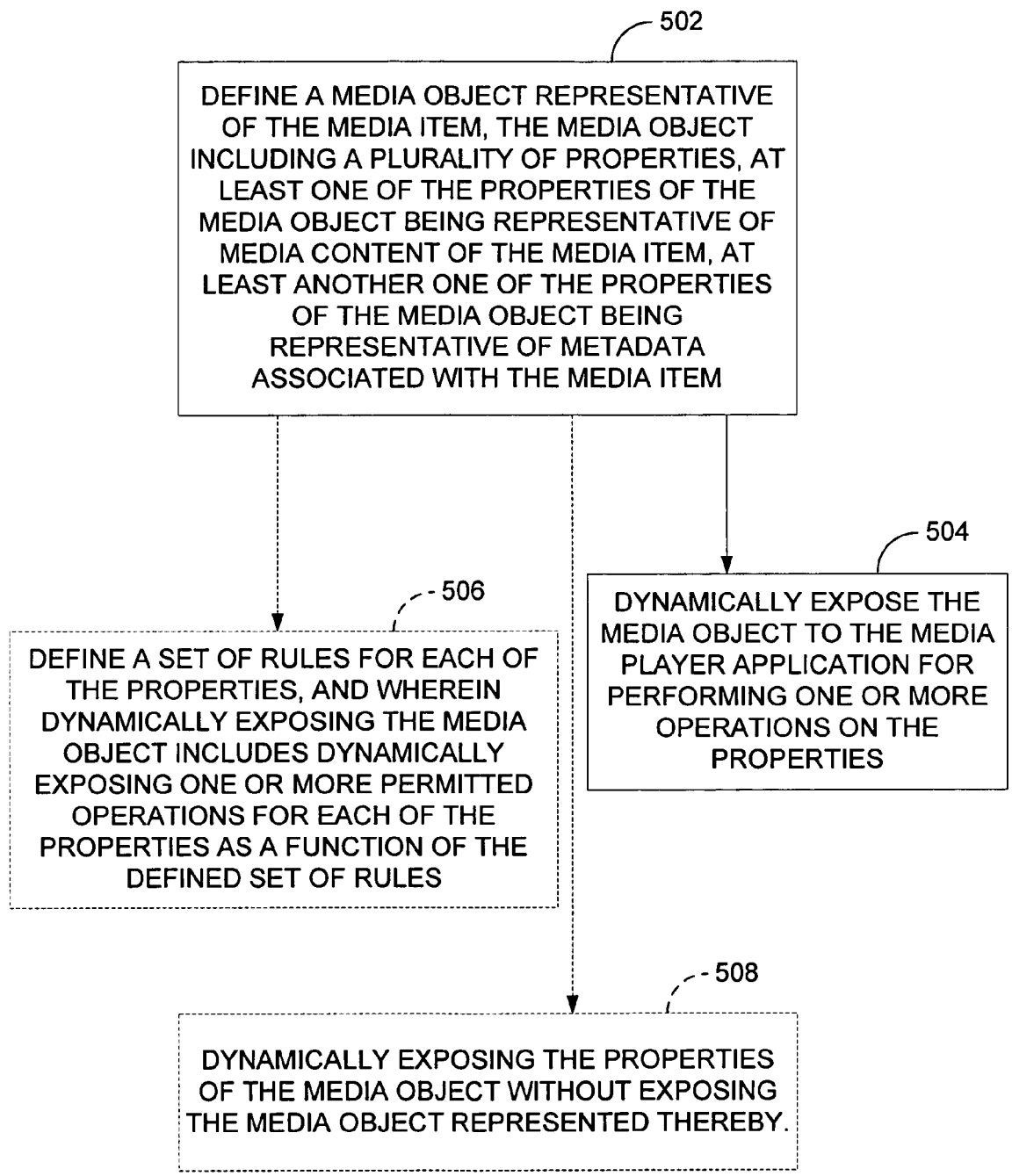
FIG. 5 is a flow chart illustrating a method for representing and managing media objects according to an embodiment of the invention.

FIG. 5 is a flow chart illustrating a method for managing media objects on a computer (e.g., system 100 or 130), and the computer executes a media player application for rendering one or more of the media objects. Each of said media objects has metadata associated therewith. In 502, a media object is defined being representative of the media item. The media object includes a plurality of properties with at least one of said properties of the media object being representative of media content of the media object and with at least another one of the properties of the media object being representative of metadata associated with the media object. In 504, the media object is dynamically exposed to the media player application for performing one or more operations on the properties.

In one embodiment, a set of rules for each of the properties is defined and the one or more operations are exposed for each of the properties as a function of the defined set of rules in 506. In an alternative embodiment, a notification is provided to the media player application when one or more of the properties of the media object are modified. In one embodiment where the media object is collectively organized in a playlist, the playlist is parsed locally at system 100 or system 130 to resolve the playlist for rendering the media object by the media player application (e.g., media player application 110). In an alternative embodiment, the properties of the media object is dynamically exposing without exposing the media object represented thereby in 508.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method implemented at least in part by a computing device for managing media items stored on a plurality of external storage media, said media items each having metadata associated therewith, said method comprising:

identifying a plurality of media objects on the plurality of external storage media, each of said media objects being representative of a media item, each of said media objects including a plurality of properties, at least one of said properties of each of the media objects being representative of media content of the media item represented thereby, at least another one of said properties of each of the media objects being representative of metadata associated with the media item represented thereby;

receiving a query from a user for one or more of the media items represented by the plurality of media objects, said query being received by the computing device via a media player application executed on the computing device;

in response to the received query, establishing a connection between the computing device and the plurality of external storage media, said establishing comprising performing a bind operation between the media player application and each of the external storage media, said bind operation initializing a temporary memory structure and being specific to each of the external storage media, said temporary memory structure providing a binding between the media player application and each of the external storage media, said establishing further comprising converting the bind operation specific to each of the external storage media into a network standard;

searching, based on the received query, the metadata associated with the media items via an application programming interface (API) implemented on the external storage medium to identify zero or more media objects on the external storage medium responsive to the query, said searching further comprising sending a search request to the external storage medium via the converted bind operation;

organizing a collection on the external storage medium, said organized collection including the identified zero or more media objects resulting from the query;

identifying a collection object on the external storage medium, said collection object being representative of the organized collection of zero or more media objects, said collection object including a plurality of properties, at least one of said properties of the collection object including collection metadata, said collection metadata being associated with the received query and with the zero or more media objects resulting from the received query; and dynamically exposing the collection object from the external storage medium to the media player application on the computing device for performing one or more operations on the properties of the exposed collection object, wherein dynamically exposing the collection object comprises presenting the collection metadata or the media objects in the organized collection to the user without the zero or more media items represented thereby actually being copied to a storage medium of the computing device.

2. The method of claim 1, further comprising defining a set of rules for each of the properties, and wherein dynamically exposing the collection object includes dynamically exposing one or more operations for each of the properties as a function of the defined set of rules.

3. The method of claim 1, further comprising providing a notification to the media player application when one or more of the properties of the media object are modified.

4. The method of claim 1, wherein the collection object comprises a media object.

5. The method of claim 1, wherein each of the plurality of properties of the media object is represented by a variant type, and wherein said variant type allows a single read/write operation for a list of properties.

6. The method of claim 1, further comprising defining a plurality of media objects each representative of a media item and organizing the media objects as a media collection in a hierarchical structure, said media items represented by the media objects in the collection based on one or more of the following: sharing at least one common feature based on metadata associated with the media items, or defined by the user.

7. The method of claim 6, wherein one or more media items are accessible by the computing device via a data communication network, wherein at least one of the media items is representative of one or more of the following: a playlist selected from the media items and the media collection.

8. The method of claim 7, further comprising parsing the playlist locally at the computing device to resolve the playlist for rendering the media items by the media player application.

9. The method of claim 6, wherein the hierarchical structure is a tree structure.

10. The method of claim 1, wherein presenting the media object comprises dynamically exposing the properties of the media object without exposing the media item represented thereby.

11. The method of claim 1, further comprising defining an item player object representative of the media player application, said item player object including one or more properties, at least one of said properties of the item player object being representative of media playback operations.

12. The method of claim 11, further comprising exposing the item player object for performing one or more of the following operations: media transport, manipulating the state of one or more output devices, obtaining state information pertaining to rendering, and sending event notifications of different states during rendering.

13. One or more computer storage media having computer-executable instructions stored thereon that, when executed, perform the method of claim 1.

14. One or more computer storage media having computer-executable components for managing media items on a plurality of media sources, each of said media sources implementing a distinct application programming interface, each of said media items having metadata associated therewith, said computer-executable components comprising:
  a collection discovery component for selecting zero or more media objects for a collection in response to generating a result for a query of zero or more media items received from a user via a media player application, said query resulting in free-form searching of the metadata associated with the media items on the plurality of media sources via the application programming interface of each media source, said searching comprising sending a search request to the media sources via a bind operation between the media player application and the media sources, said bind operation initializing a temporary memory structure and being specific to each of the media sources, said temporary memory structure providing a binding between the media player application and each of the media sources, said collection having collection metadata associated therewith, said collection metadata including information relating to the received query and the zero or more media objects resulting from the received query;
  a media collection component for defining a plurality of objects, said objects including at least one of the following: a media object and a collection object, said collection object being representative of zero or more media items in the collection, said media object including a property representative of metadata associated with the media item in the collection, said property being defined by at least one of the following criteria: metadata associated with media item represented by said media object and a user-defined criterion, said collection object including at least a property representative of the collection metadata; and
  a collection rendering component for exposing the objects to the media player application for performing one or more operations on either the media object property or the collection object property or both, wherein the collection rendering component presents the property of at least one of the following without the one or more media items actually being instantiated: the media object if the collection includes at least one media item, the collection object if the collection includes zero or more media,
  wherein the collection discovery component is configured to notify the user when the user is located close to another user who is broadcasting an electronic offer to share media objects.

15. The computer storage media of claim 14, wherein:
the media collection component is further configured to define a set of rules for the exposure of a media object property or a collection object property, and wherein the media collection component is further configured to dynamically expose a correct property as a function of the defined set of rules;
the media collection component is further configured to provide a notification to the media player application when one or more of the properties of the media object are modified;
the media collection component is further configured to organize the collection in a hierarchical structure, said collection including the zero or more media objects, each of the zero or more media objects in the collection is defined based on one or more of the following: sharing at least one common feature based on metadata associated with the media objects, or defined by user defined criteria, wherein upon querying by the user, a root of the hierarchical structure reports leaf nodes of the hierarchical structure as children of the root, rather than immediate children of the root;
the collection rendering component is configured to query the hierarchical structure to resolve the hierarchical structure for rendering the remote media objects by the media player application;
the collection rendering component comprises zero or more object players for rendering the zero or more media objects and one or more collection players for rendering the collection; and the collection rendering component is further configured to dynamically expose the parsed media object property or the collection object property without exposing the media object or the collection represented thereby.

16. The computer storage media of claim 14, wherein the one or more media items are accessible by the media player application via a data communication network, and wherein at least one of the items is representative of one or more of the following: a playlist selected from the media items and the collection.

17. A method for managing media content by a media player application executed on a computing device, said method comprising:

performing a bind operation between the media player application and each of a plurality of external storage media, said bind operation initializing a temporary memory structure and being specific to each of the external storage media, said temporary memory structure providing a binding between the media player application and each of the external storage media, exposing zero or more media objects to the media player application, each media object being representative of a media item, said media object including a plurality of properties, at least one of said properties of the media object being representative of media content of the media item, at least another one of said properties of the media object being representative of metadata associated with the media item, said media object being exposed to the media player application for performing one or more operations on the properties; and exposing a collection object representative of a collection of the zero or more media objects to the media player application, said collection object including a plurality of properties, at least one of the plurality of properties of the collection object including collection metadata, said collection metadata being representative of a user-generated search query originating from the media player application and sent to the external storage media via the bind operation and being representative of the media objects resulting from the search query, wherein, if the collection includes at least one media object, the collection object exposes the property of the at least one media object, and if the collection includes zero media objects, the collection object having the included information relating to the query is returned to the user.

18. The method of claim 17, wherein each property of the media object is represented by a variant type, and wherein said variant type allowing a single read/write operation for the plurality of properties types.

19. The method of claim 17, further comprising defining a hierarchical structure for organizing the collection object of zero media objects, said collection object represented by the zero objects in the hierarchical structure being defined by user selections.

* * * * *